US010116861B1

(12) United States Patent
Graham et al.

(10) Patent No.: US 10,116,861 B1
(45) Date of Patent: Oct. 30, 2018

(54) GUIDED IMAGE CAPTURE USER INTERFACE

(71) Applicants: Jamey Graham, Cupertino, CA (US); Daniel G Van Olst, Cupertino, CA (US)

(72) Inventors: Jamey Graham, Cupertino, CA (US); Daniel G Van Olst, Cupertino, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/671,278

(22) Filed: Aug. 8, 2017

Related U.S. Application Data

(60) Provisional application No. 62/492,840, filed on May 1, 2017.

(51) Int. Cl.
*H04N 5/222* (2006.01)
*H04N 5/232* (2006.01)
*G06K 9/32* (2006.01)
*G06K 7/14* (2006.01)

(52) U.S. Cl.
CPC ....... *H04N 5/23222* (2013.01); *G06K 7/1404* (2013.01); *G06K 9/3241* (2013.01); *H04N 5/23216* (2013.01)

(58) Field of Classification Search
CPC .................. H04N 5/23222; G06K 9/3241
See application file for complete search history.

(56) References Cited

U.S. PATENT DOCUMENTS

| 8,401,924 B1* | 3/2013 | Rajyaguru | G06Q 30/0629 |
| | | | 705/26.1 |
| 9,870,388 B2* | 1/2018 | Erol | G06F 17/30386 |

\* cited by examiner

*Primary Examiner* — Gary C Vieaux
(74) *Attorney, Agent, or Firm* — Patent Law Works LLP

(57) ABSTRACT

A system and method for generating user interfaces for presenting a set of templates to guide a user to capture images of the items correctly sized under different conditions is disclosed. The method includes generating a first user interface configured to receive and present product information for an item including dimensions of the item, receiving a first image, generating a second user interface to present a template, the template including a bounding box sized to match the dimensions of the item, the second user interface configured to present the bounding box overlaid over a second image, receiving input to capture a portion of the second image within the bounding box, responsive to the input to capture the second image, generating a third user interface to present the first image and the captured portion of the second image as variants of a face of the item, and storing the captured portion of the second image as a variant of the face of the item and the information of the item in a database.

20 Claims, 24 Drawing Sheets

=

750

006E
GUIDED IMAGE CAPTURE USER INTERFACE

CROSS REFERENCE TO RELATED APPLICATIONS

The present application claims priority, under 35 U.S.C. § 119, of U.S. Provisional Patent Application No. 62/492,840, filed May 1, 2017 and entitled "Guided Image Capture User Interface," which is incorporated by reference in its entirety.

BACKGROUND

Field of the Invention

The specification generally relates to obtaining product images to build a product database for a computer vision system. In particular, the specification relates to a system and method for generating user interfaces for presenting a set of templates to guide a user to capture images of the items correctly sized under different conditions.

Description of the Background Art

Typically, computer vision systems are used to gain a high-level understanding from digital images or videos. Computer vision tasks include methods for acquiring, processing, analyzing and understanding digital images, and extraction of high-dimensional data from the real world in order to produce numerical or symbolic information. One important aspect of computer vision is creating a database against which new images can be compared. In particular, with regard to the recognition of objects or products, a complete database is important. The image recognition process includes receiving a query image of a product and searching the database to determine whether one of the images stored in the database matches the query image. If there is a positive match, the image recognition succeeds. However, even if the database includes the information of the product, the image recognition does not always succeed when the database has limited information about each product.

Previous attempts at recognizing products have deficiencies. For example, recognizing a product may fail because stored images in a database used for searching a match for the query image of the product does not look "similar" to the query image. The right kind of images and a sufficient number of images should be stored in the database to support a robust image recognition. Unfortunately, current methods do not provide a reliable and efficient solution to this problem.

SUMMARY

The techniques introduced herein overcome the deficiencies and limitations of the prior art, at least in part, with a system and method for generating user interfaces for presenting a set of templates to guide a user to capture images of the items correctly sized under different conditions. In one embodiment, the system includes one or more processors and a memory storing instructions which when executed cause the one or more processors to perform steps to generate and present user interfaces. These steps include generating a first user interface configured to receive and present product information for an item including dimensions of the item. Then receiving a first image and generating a second user interface to present a template, the template including a bounding box sized to match the dimensions of the item, the second user interface configured to present the bounding box overlaid over a second image. The system then receives input to capture a portion of the second image within the bounding box. Responsive to the input to capture the portion of the second image, the system generates a third user interface to present the first image and the captured portion of the second image as variants of a face of the item; and store the captured portion of the second image as a variant of the face of the item and the information of the item in a database.

Other aspects include corresponding methods, systems, apparatuses, and computer program products for these and other innovative aspects.

The features and advantages described herein are not all-inclusive and many additional features and advantages will be apparent in view of the figures and description. Moreover, it should be noted that the language used in the specification has been principally selected for readability and instructional purposes and not to limit the scope of the techniques described.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
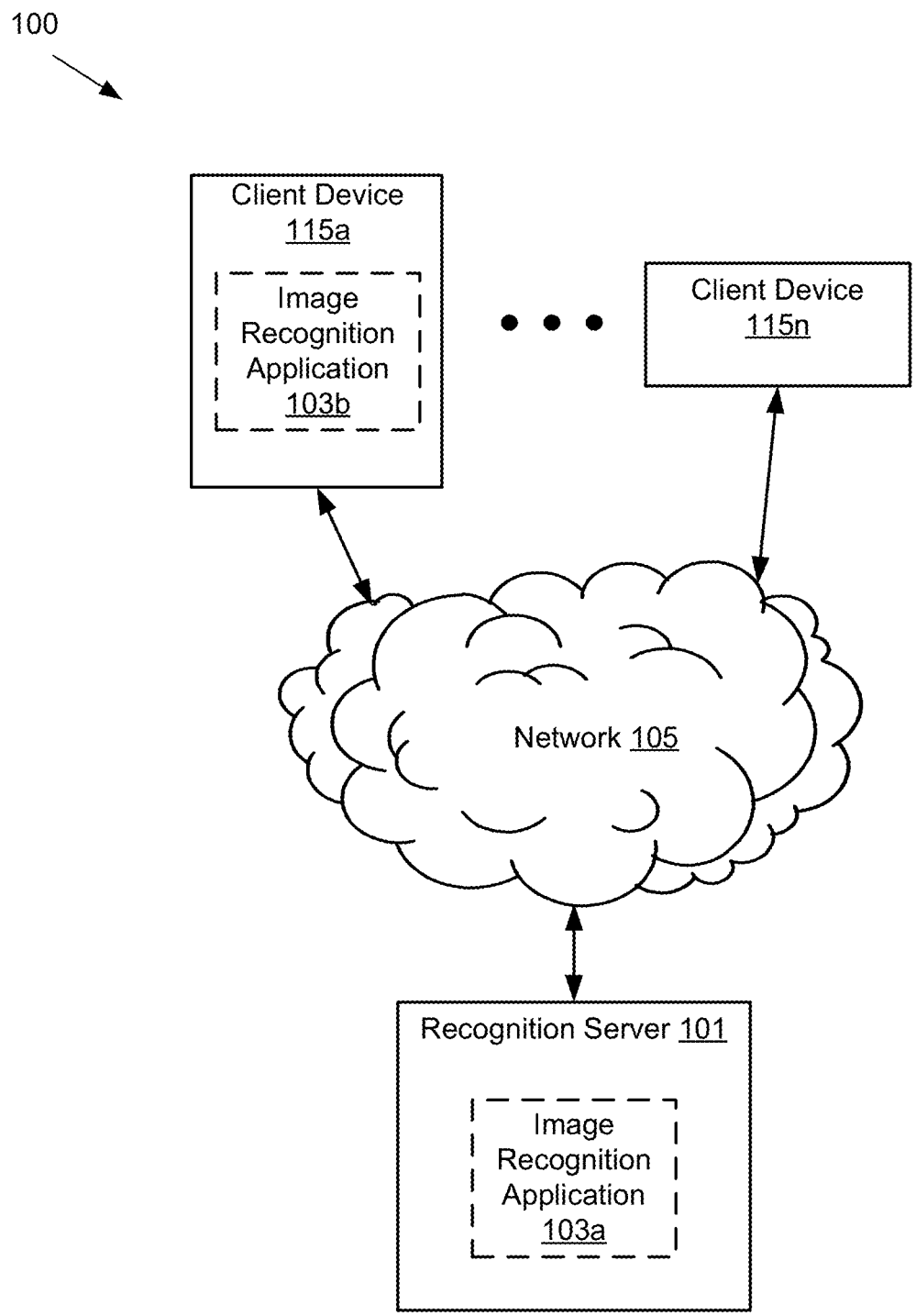
FIG. 1 is a high-level block diagram illustrating one embodiment of a system for generating user interfaces for presenting a set of templates to guide a user to capture images of the items correctly sized under different conditions.

FIG. 1 is a high-level block diagram illustrating one embodiment of a system 100 for generating user interfaces for presenting a set of templates to guide a user to capture images of the items correctly sized under different conditions. The illustrated system 100 may have one or more client devices 115a . . . 115n that can be accessed by users and a recognition server 101. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or include portions of a telecommunications network for sending data in a variety of different communication protocols. In some embodiments, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the client devices 115 and the recognition server 101, in practice one or more networks 105 can be connected to these entities.

In some embodiments, the system 100 includes a recognition server 101 coupled to the network 105. The recognition server 101 may be, or may be implemented by, a computing device including a processor, a memory, applications, a database, and network communication capabilities. In the example of FIG. 1, the components of the recognition server 101 are configured to implement an image recognition application 103a described in more detail below. In some embodiments, the recognition server 101 receives images of an item through a guided information capture process, and stores the images in a database to create or augment the database. The guided information capture process provides instructions and parameters to a user so that the user can follow the instructions and use the parameters to capture an image with the characteristics needed for computer vision and making the database more complete. The resulting database supports robust image recognition because images captured in a guided information capture process and stored in the database may share more similarities with any random query image, and therefore lead to a higher probability of a match or a larger number of matches. For example, the stored images of a product may have different versions (e.g., a regular package as well holiday packages, promotional packages of a product), have different faces (e.g., front, back, left, right), have being taken from different distance, etc. While the examples herein describe recognition of retail products in an image of shelves, such as a retail display, it should be understood that the image may include any arrangement of organized objects or items. For example, the image may be of a warehouse, stockroom, store room, cabinet, etc. Similarly, the objects, in addition to retail products, may be tools, parts used in manufacturing, construction or maintenance, medicines, first aid supplies, emergency or safety equipment, etc. In some embodiments, the recognition server 101 also communicates with other components of the system 100 (not shown) to provide other services based on the recognized object, for example, to determine a structured way to arrange a placement of recognized products (e.g., a planogram), to identify users that are interested in the recognized object and share the images of the recognized object among the identified users, etc.

In some embodiments, the recognition server 101 sends and receives data to and from other entities of the system 100 via the network 105. For example, the recognition server 101 sends and receives data including images to and from the client device 115. The images received by the recognition server 101 can include an image captured by the client device 115, an image copied from a web site or an email, or an image from any other source. Although only a single recognition server 101 is shown in FIG. 1, it should be understood that there may be any number of recognition servers 101 or a server cluster. The recognition server 101 may include data storage.

The client device 115 may be a computing device that includes a memory, a processor and a camera, for example a laptop computer, a desktop computer, a tablet computer, a mobile telephone, a smartphone, a personal digital assistant (PDA), a mobile email device, a webcam, a user wearable computing device or any other electronic device capable of accessing a network 105. The client device 115 provides general graphics and multimedia processing for any type of application. For example, the client device 115 may include a graphics processor unit (GPU) for handling graphics and multimedia processing. The client device 115 includes a display for viewing information provided by the recognition server 101. While FIG. 1 illustrates two client devices 115a and 115n, the disclosure applies to a system architecture having one or more client devices 115.

The client device 115 is adapted to send and receive data to and from the recognition server 101. For example, the client device 115 sends a captured image to the recognition server 101 and the recognition server 101 provides data in JavaScript Object Notation (JSON) format about one or more objects recognized in the captured image to the client device 115. The client device 115 may support use of graphical application program interface (API) such as Metal on Apple iOS™ or RenderScript on Android' for determination of feature location and feature descriptors during image processing.

The image recognition application 103 may include software and/or logic to provide the functionality for presenting a set of templates to guide a user to capture images of the items correctly sized under different conditions. In some embodiments, the image recognition application 103 can be implemented using programmable or specialized hardware, such as a field-programmable gate array (FPGA) or an application-specific integrated circuit (ASIC). In some embodiments, the image recognition application 103 can be implemented using a combination of hardware and software. In other embodiments, the image recognition application 103 may be stored and executed on a combination of the client devices 115 and the recognition server 101, or by any one of the client devices 115 or recognition server 101.

In some embodiments, the image recognition application 103b may be a thin-client application with some functionality executed on the client device 115 and additional functionality executed on the recognition server 101 by the image recognition application 103a. For example, the image recognition application 103b on the client device 115 could include software and/or logic for capturing an image, transmitting the image to the recognition server 101, and displaying image recognition results. In another example, the image recognition application 103a on the recognition server 101 could include software and/or logic for generating a series of templates for use in the image captures. The image recognition application 103a or 103b may include further functionality described herein, such as, processing the image and performing feature identification. The operation of the image recognition application 103 and the functions listed above are described below in more detail below with reference to FIGS. 2-10.

Figure 2:
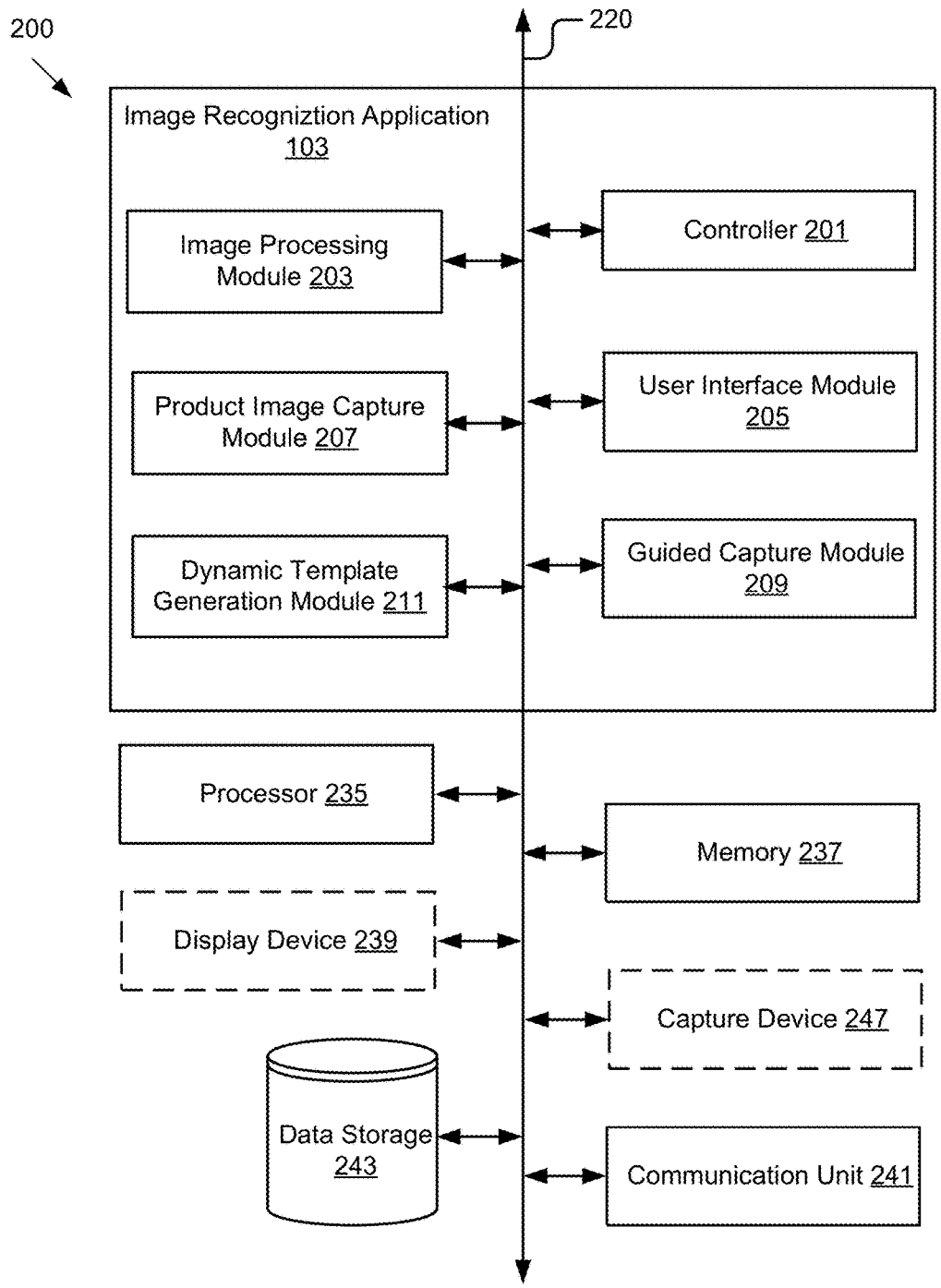
FIG. 2 is a block diagram illustrating one embodiment of a computing device including an image recognition application.

FIG. 2 is a block diagram illustrating one embodiment of a computing device 200 including an image recognition application 103. The computing device 200 may also include a processor 235, a memory 237, an optional display device 239, a communication unit 241, data storage 243, and an optional capture device 247 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the recognition server 101, or a combination of the client device 115 and the recognition server 101. In such embodiments where the computing device 200 is the client device 115 or the recognition server 101, it should be understood that the client device 115, and the recognition server 101 may include other components described above but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, performing complex tasks including various types of feature extraction and sampling, etc. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the image recognition application 103, and the data storage 243. It will be apparent to one skilled in the art that other processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the image recognition application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images, and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 is shown in FIG. 2 with dashed lines to indicate it is optional. For example, where the computing device 200 is the recognition server 101, the display device 239 is not part of the system, where the computing device 200 is the client device 115, the display device 239 is included and is used to display images and associated recognition results.

The communication unit 241 is hardware for receiving and transmitting data by linking the processor 235 to the network 105 and other processing systems. The communication unit 241 receives data such as requests from the client device 115 and transmits the requests to the controller 201, for example a request to process an image. The communication unit 241 also transmits information including recognition results to the client device 115 for display, for example, in response to processing the image. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory, or some other memory devices. In some embodiments, the data storage 243 also may include a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220. The data storage 243 stores data for analyzing a received image and results of the analysis and other functionality as described herein. For example, the data storage 243 may store a database table for a plurality of items or objects (e.g., stock keeping units) for image recognition purposes. A stock keeping unit (SKU) is a distinct item, such as a product offered for sale. The term stock keeping unit or SKU may also refer to a unique identifier that refers to the particular product. The database table includes all attributes that makes the item distinguishable as a distinct object from all other items. For example, the attributes of a product include a unique identifier (e.g., Universal Product Code (UPC)), product name, physical dimensions (e.g., width, height, depth, etc.), size (e.g., liters, gallons, ounces, pounds, kilograms, fluid ounces, etc.), facing side (e.g., front, back, side, top, bottom, etc.), description, brand manufacturer, color, packaging version, material, model number, price, discount, base image, etc. The attributes may be automatically detected and determined by the system 100, or received from user input, or obtained based on the combination of the two. In some embodiments, the data storage 243 also stores variant images associated with one or more sides of an item and templates used in capturing the variant images. In other embodiments, the data storage 243 further stores a received image of the item and the set of features determined for the received image.

The capture device 247 may be operable to capture an image or data digitally of an object of interest. For example, the capture device 247 may be a high definition (HD) camera, a regular 2D camera, a multi-spectral camera, a structured light 3D camera, a time-of-flight 3D camera, a stereo camera, a standard smartphone camera, or a wearable computing device. The capture device 247 is coupled to the bus to provide the images and other processed metadata to the processor 235, the memory 237, or the data storage 243. It should be noted that the capture device 247 is shown in FIG. 2 with dashed lines to indicate it is optional. For example, where the computing device 200 is the recognition server 101, the capture device 247 is not part of the system, where the computing device 200 is the client device 115, the capture device 247 is included and is used to provide images and other metadata information described below.

In some embodiments, the image recognition application 103 may include a controller 201, an image processing module 203, a user interface module 205, a product image capture module 207, a guided capture module 209, and a dynamic template generation module 211. The components of the image recognition application 103 are communicatively coupled via the bus 220. The components of the image recognition application 103 may each include software and/or logic to provide their respective functionality. In some embodiments, the components of the image recognition application 103 can each be implemented using programmable or specialized hardware including a field-programmable gate array (FPGA) or an application-specific integrated circuit (ASIC). In some embodiments, the components of the image recognition application 103 can each be implemented using a combination of hardware and software executable by the processor 235. In some embodiments, the components of the image recognition application 103 may each be stored in the memory 237 and be accessible and executable by the processor 235. In some embodiments, the components of the image recognition application 103 may each be adapted for cooperation and communication with the processor 235, the memory 237, and other components of the image recognition application 103 via the bus 220.

The controller 201 may include software and/or logic to control the operation of the other components of the image recognition application 103. The controller 201 controls the other components of the image recognition application 103 to perform the methods described below with reference to FIGS. 9-10. The controller 201 may also include software and/or logic to provide the functionality for handling communications between the image recognition application 103 and other components of the computing device 200 as well as between the components of the image recognition application 103.

In some embodiments, the controller 201 sends and receives data, via the communication unit 241, to and from one or more of the client device 115 and the recognition server 101. For example, the controller 201 receives, via the communication unit 241, an image from a client device 115 operated by a user and sends the image to the image processing module 203. In another example, the controller 201 receives data for providing a graphical user interface to a user from the user interface module 205 and sends the data to a client device 115, causing the client device 115 to present the user interface to the user.

In some embodiments, the controller 201 receives data from other components of the image recognition application 103 and stores the data in the data storage 243. For example, the controller 201 receives data including features identified for an image from the image processing module 203 and stores the data in the data storage 243. In other embodiments, the controller 201 retrieves data from the data storage 243 and sends the data to other components of the image recognition application 103. For example, the controller 201 retrieves data including an item or product from the data storage 243 and sends the retrieved data to the user interface module 205.

In some embodiments, the communications between the image recognition application 103 and other components of the computing device 200 as well as between the components of the image recognition application 103 can occur autonomously and independent of the controller 201.

The image processing module 203 may include software and/or logic to provide the functionality for receiving and processing one or more images from the client device 115.

For example, the images may include an image of a product in a retail store. If no information of this product is found in a product database, this image serves as a starting point in creating the database for future recognition of the product.

In some embodiments, the image processing module 203 receives one or more images from the client device 115 for recognition and may include one or more objects of interest. For example, the image can be an image of a packaged product (e.g., a coffee package, a breakfast cereal box, a soda bottle, etc.) on a shelf of a retail store. A packaged product of a brand manufacturer may include textual and pictorial information printed on its surface that distinguishes it from packaged products belonging to one or more other brand manufacturers. The packaged products may also sit in an orientation on the shelf exposed to the user looking at the shelf. For example, a box-like packaged product might be oriented with the front, the back, the side, the top, or the bottom of the product exposed to the user looking at the shelf. It should be understood that there can be other products displayed on shelves without having a package.

In some embodiments, the image processing module 203 determines whether successful recognition is likely on the received image and instructs the user interface module 205 to generate graphical data including instructions for the user to retake the image if a section of the image captured by the client device 115 has limited information for complete recognition (e.g., a feature rich portion is cut off), the image is too blurry, the image has an illumination artifact (e.g., excessive reflection), etc. In other embodiments, the image processing module 203 may receive a single image as it is without any distortion.

In some embodiments, the image processing module 203 determines a set of features for the image. For example, the image processing module 203 may determine a location (X-Y coordinates), an orientation, and an image descriptor for each feature identified in the image. In some embodiments, the image processing module 203 uses corner detection algorithms for determining feature location. For example, the corner detection algorithms can include Shi-Tomasi corner detection algorithm, Harris and Stephens corner detection algorithm, etc. In some embodiments, the image processing module 203 uses feature description algorithms for determining efficient image feature descriptors. For example, the feature description algorithms may include Binary Robust Independent Elementary Features (BRIEF), Scale-Invariant Feature Transform (SIFT), etc. An image descriptor of a feature may be a 256-bit bitmask which describes the image sub-region covered by the feature. In some embodiments, the image processing module 203 may compare each pair of 256 pixel pairs near the feature for intensity and based on each comparison, the image processing module 203 may set or clear one bit in the 256-bit bitmask.

In some embodiments, the image processing module 203 matches the features of the image with the features of templates associated with a plurality of items for performing image recognition. For example, the image processing module 203 uses the database table storing information for products in the data storage 243 for analyzing the features of the image. The image processing module 203 identifies a region of interest (ROI) bordering each of the matched items in the image. A region of interest can be of any shape, for example, a polygon, a circle with a center point and a diameter, a rectangle having a width, a height and one or more reference points for the region (e.g., a center point, one or more corner points for the region), etc. For example, the region of interest may be a recognition rectangle bordering the matched item in its entirety. In another example, the region of interest may border the exposed label containing pictorial and textual information associated with the matched item.

In some embodiments, the image processing module 203 recognizes an item or product associated with the region of interest based on matching the image features from the image with the template features stored for a plurality of items. Symbolic information or metadata is determined in association with a recognition result for an identified item by the image processing module 203, and the symbolic information may include a Universal Product Code (UPC), position (e.g., position in relative X-Y coordinates, a slot position on a shelf, a particular shelf off the ground, etc.), facing side (e.g., top, bottom, front, back, or side) and dimensions (e.g., width, height, etc.) of the region of interest, and other metadata (e.g., packaging version). In some embodiments, the image processing module 203 determines the coordinate position and the dimensions of the items recognized in the image in relative units. The relative units do not correspond to physical dimensions, such as inches.

In some embodiments, the image processing module 203 sends data including the recognition result to the product image capture module 207, the guided capture module 209, and the dynamic template generation module 211 to start a guided information capture process to capture one or more images of an item. In other embodiments, the image processing module 203 stores the data in the data storage 243.

The user interface module 205 may include software and/or logic for providing user interfaces to a user. In some embodiments, the user interface module 205 receives instructions from the image processing module 203 to generate a user interface for the display of recognition results on the client device 115. In some embodiments, the user interface module 205 communicates with the product image capture 207, the guided capture module 209, and the dynamic template generation module 211 to generate graphical user interfaces to provide instructions and parameters on the display of the client device 115 such that a user can be instructed and use the parameters to capture an image of an item. In some embodiments, the user interface module 205 generates graphical user interface for displaying the product database as a tabular representation for searching by the user. In other embodiments, the user interface module 205 sends graphical user interface data to an application (e.g., a browser) in the client device 115 via the communication unit 241 causing the application to display the data as a graphical user interface.

While the present disclosure is described in the context of being part of the image recognition application 103 here and below, it should be understood that this is just one implementation example, and that the present disclosure, particularly the product image capture module 207, the guided capture module 209, and the dynamic template generation module 211 may be implemented in a number of various other configurations. For example, the product image capture module 207, the guided capture module 209, and the dynamic template generation module 211 may be used together as a stand-alone application to add images or augment a database used by a computer vision system. In another configuration, the product image capture module 207, the guided capture module 209, and the dynamic template generation module 211 may be used together as a mobile application for a mobile phone or tablet. In such cases, the stand-alone application may be a product image capture (PIC) application that includes the controller 201, the image processing module 203, the user interface module 205, the product image capture module 207, the guided capture module 209, and the dynamic template generation module 211.

The product image capture module 207 may include software and/or logic for generating user interfaces to receive information of an item (e.g., a product) and guide a user to capture one or more images of the item based on the received information. In some embodiments, the product image capture module 207 communicates with the user interface module 205, the guided capture module 209, the dynamic template generation module 211 as well as other components of the image recognition application 103 to perform the methods described below with reference to FIGS. 9-10.

One goal of the product image capture module 207 working together with other components of the image recognition application 103 (e.g., as a universal OS application) is to implement a guided image capture process to create a library with captured core product images. Another goal is to generate improved user interfaces for instructing users to capture images. The user interfaces are improved in that they are generated based on one or more cards, they improve a workflow of capturing and storing product information, and they are more aesthetically pleasing user interfaces.

In some embodiments, the product image capture module 207 determines one or more cards, and communicates with the user interface module 205, the guided capture module 209, and the dynamic template generation module 211 to generate user interfaces based on the one or more cards. A card includes format and layout information of labels and fields displayed on a user interface. For example, the product image capture module 207 may determine a card to include a label name, a location of the label, a font and a font size for the label, a color of the label, etc., and cause a user interface to be generated for displaying the label with the format specified in the card. A label may be related to product information such as a version, a facing, etc. For example, the product image capture module 207 determines that a user interface should include a "UPC" label in a first line of the user interface with "Times New Roman" font in size 15 pt, a "product name" label in a second line of the user interface with wrapping text and with "Helvetica Neue light" font in size 10 pt, etc., based on the determined card. Or a label may be of an action such as "continue," "submit," "back," etc., which, once selected by a user via the user interface, causes an updated user interface. In some embodiments, a label is also associated with one or more fields that accept input from the user. For example, a "category" label is associated with a field into which the user can enter the actual category that a product belongs.

Figure 3A:
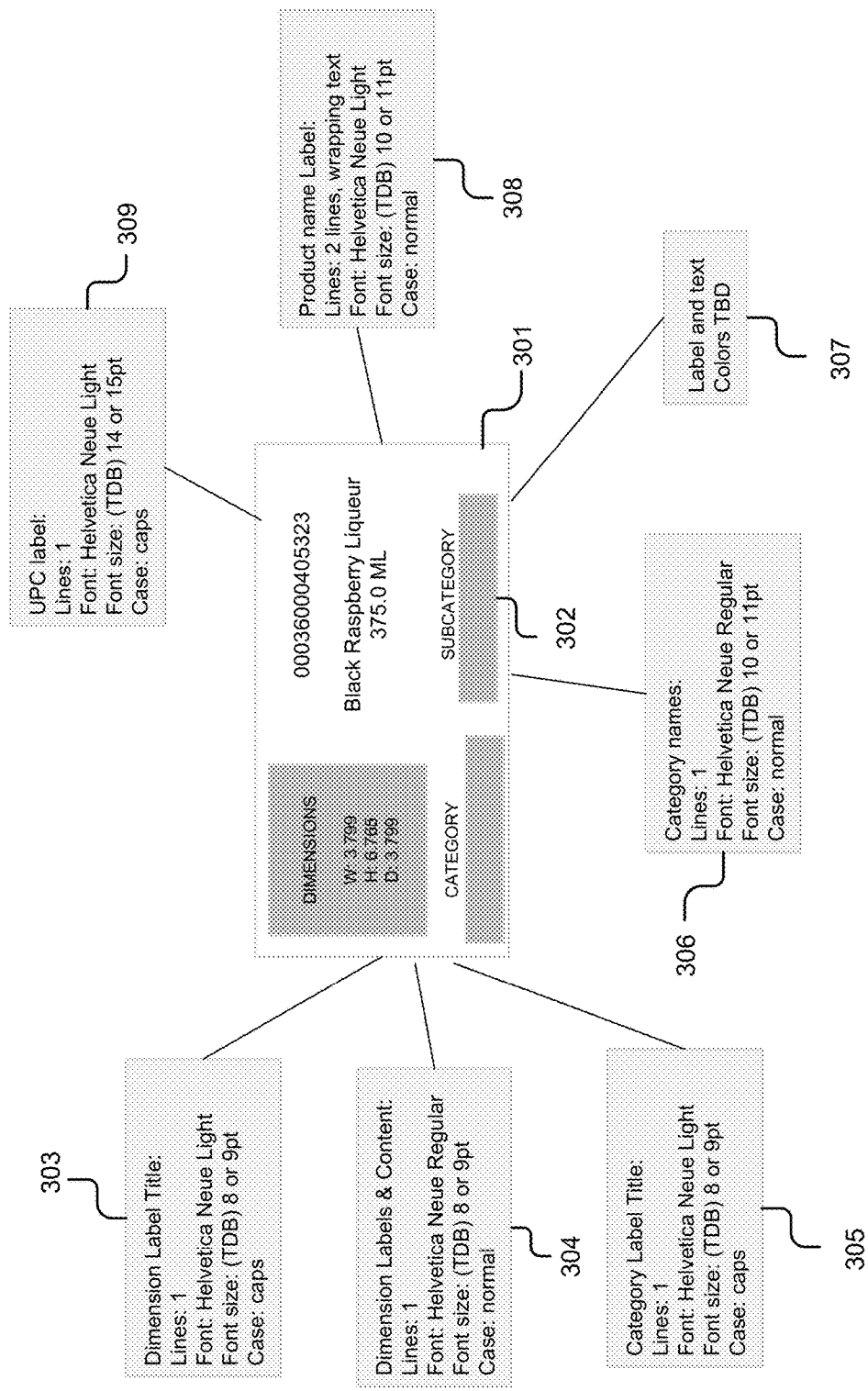
FIG. 3A is a graphical representation of example cards used to generate a user interface.

FIG. 3A is a graphical representation of example cards used to generate a user interface. A portion of a user interface 301 is shown in the center of FIG. 3A. This portion 301 displays labels such as "DIMENSIONS," "CATEGORY," and some associated fields. For example, the "SUBCATEGORY" label is associated with a field 302 for a user to input the subcategory information. The product image capture module 207 determines and specifies the format information for the labels and the fields such as a name, a location, a font, a font size, etc., in cards 303-309, and causes the labels and fields to be displayed on the portion of the user interface 301 in the format as specified in the cards 303-309.

Figure 3B:
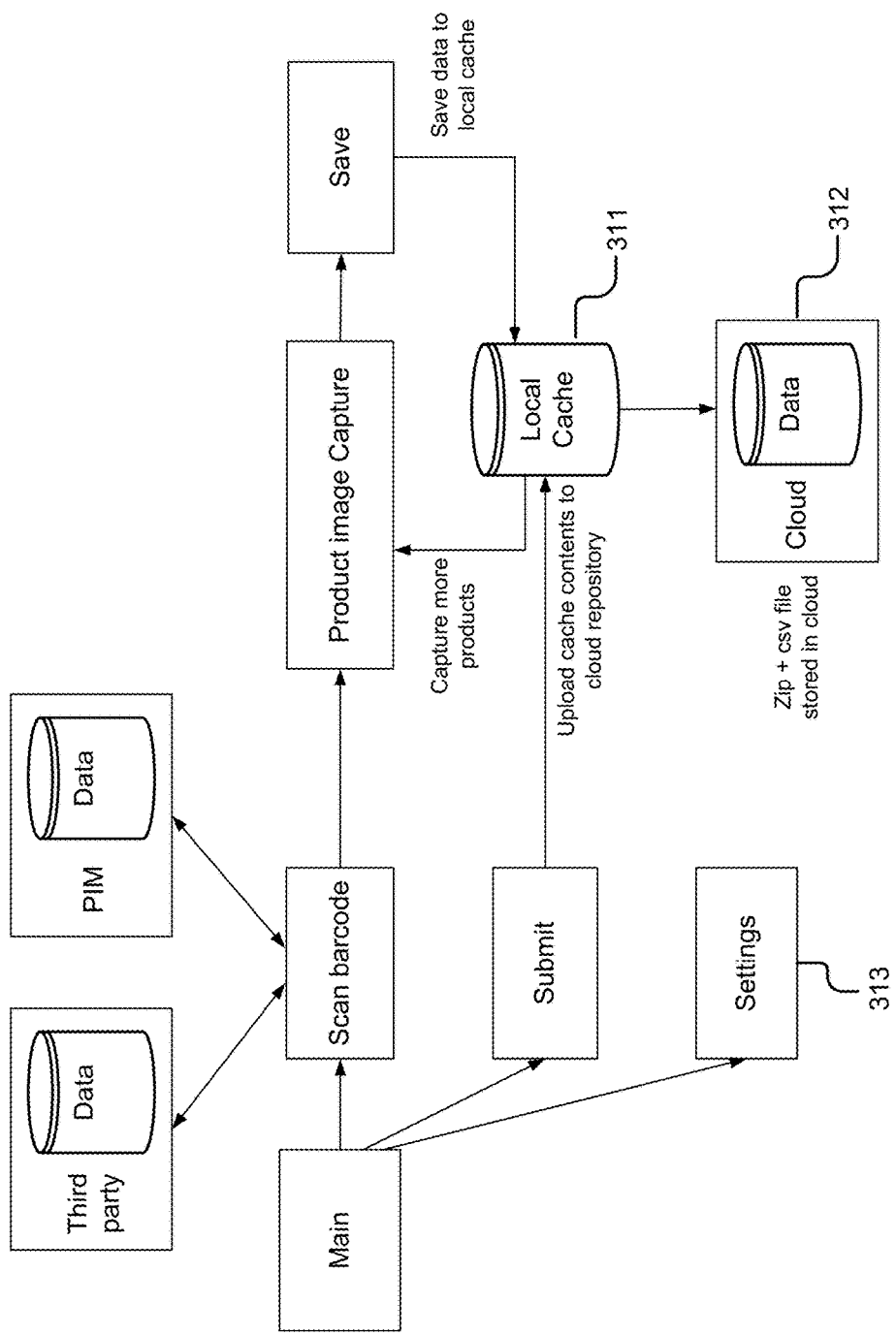
FIGS. 3B and 3C are block diagrams illustrating embodiments of an information workflow of capturing and storing product information.

In some embodiments, the product image capture module 207 communicates with the user interface module 205, the guided capture module 209, and the dynamic template generation module 211 to generate user interfaces that improves a product information workflow. FIG. 3B is a block diagram illustrating one embodiment of an information workflow of capturing and storing product information. As depicted in FIG. 3B, in some embodiments, the product image capture module 207 instructs the user interface module 205 to generate the user interfaces to first provide information capture functionality and then provide information uploading functionality after the information capture is complete. For example, the product image capture module 207 communicates the user interface module 205 to generate user interfaces to allow a user to capture product information either all at once or in small batches. The product information includes a product image and metadata associated with the image. The metadata may be inputted by the user or automatically determined by the product image capture module 207. The product image capture module 207 stores the product information captured all at once or with small batches in a local cache 311 when the capture session is continuing. Only after the capture session ends, the product image capture module 207 prompts the user via a user interface to manually invoke a "Submit" button to upload the product information obtained from the capture session and stored in the local cache 311 to a repository, e.g., a remote cloud storage 312. The cloud storage 312 may store the product information as a zip file, a csv file, etc. In this case, the product information workflow includes one-time manual information upload after a capture session of information is complete.

Figure 3C:
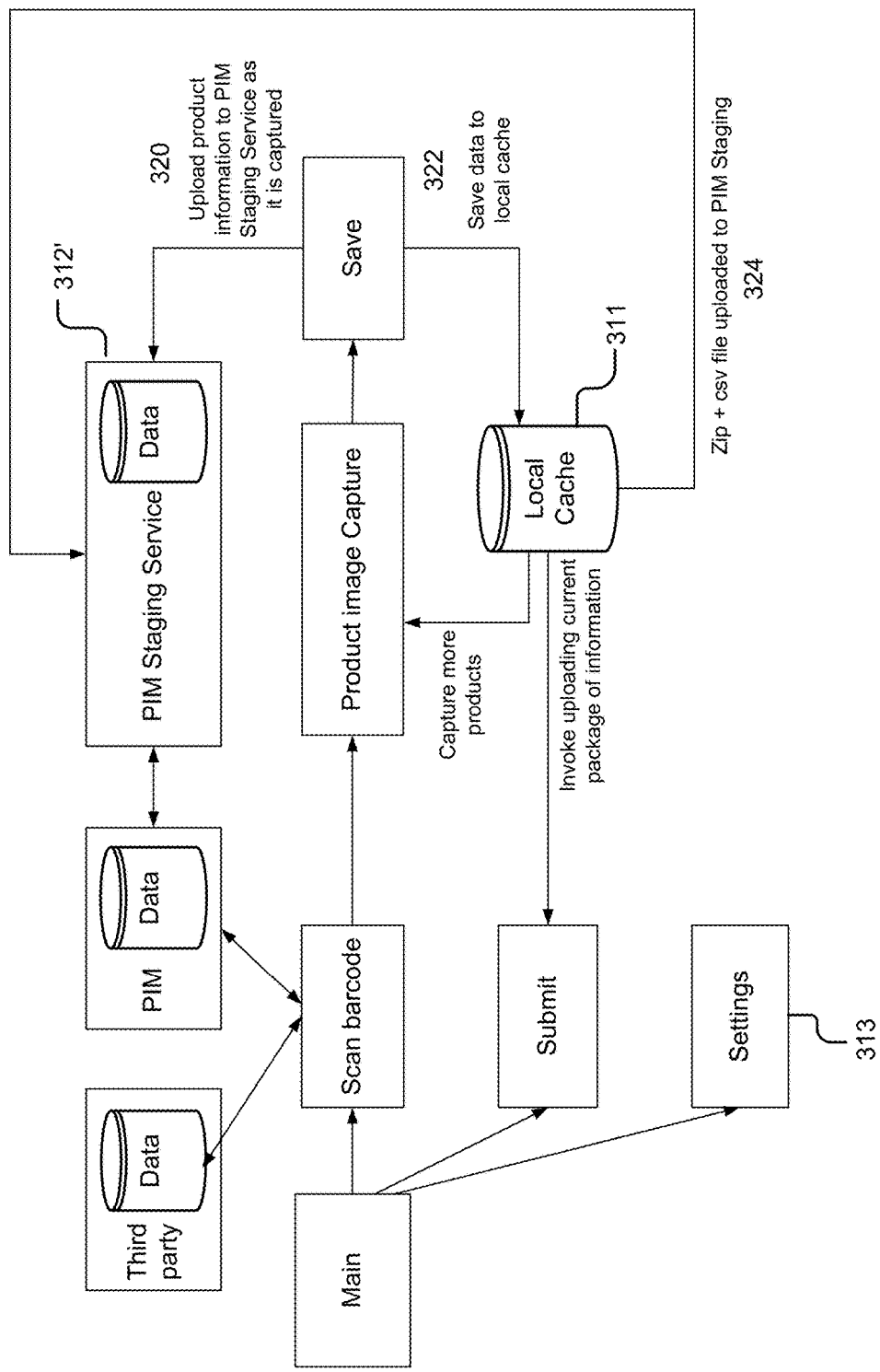

In other embodiments, the product image capture module 207 incorporates with the user interface module 205 to generate the user interfaces to provide functionality for packaged information uploading as well as incremental information uploading. FIG. 3C is a block diagram illustrating another embodiment of an information workflow of capturing and storing product information. The remote cloud storage 312' in FIG. 3C provides product image management (PIM) Staging Service as well as serving as a data repository. The product image capture module 207 allows a user to capture information of a product and save the information to the local cache 311 via a user interface until the user requests the information to be uploaded to PIM Staging Service 312' as a package, i.e., packed information upload. In addition to the packed information upload, as shown by label 320, the product image capture module 207 also uploads product information to PIM Staging Service as each image of the product is captured. In other words, the product image capture module 207 communicates with the user interface module 205 to generate a user interface to receive a product image from a user and uploads the image to PIM Staging Service without waiting for acquiring all product images or other images of a batch. This is referred as incremental information upload.

The product image capture module 207 provides alternative information upload options to accommodate different needs. Using the packaged information upload, the product image capture module 207 stores 322 the information in the local cache until it is ready to submit 324 to a cloud repository, for example, responsive to detecting good network connectivity and network bandwidth. This avoids data transmission when the network connectivity is limited, but may require an explicit user uploading request and more bandwidth for transmitting a package that is larger than an increment. Using the incremental information upload, the product image capture module 207 handles information upload automatically with no need for a user uploading request, but may require APIs to take care of details of each product. The product image capture module 207 is therefore able to efficiently utilize system and network resources (e.g., by automatically balancing the data amount and network connectivity/bandwidth), and improves the product information workflow.

In some embodiments, the product image capture module 207 also communicates with a profile module (not shown) to authenticate a user, for example, by matching the user inputted credentials to the stored credentials. Based on the authentication result, the product image capture module 207 allows or prohibits the user from capturing product images and adding product information to a database. As depicted in the of FIGS. 3B and 3C, the information workflow includes the "Settings" 313 for a user to configure the profile including adding or modifying the credentials.

The guided capture module 209 may include software and/or logic for generating and providing instructions and parameters to help a user to capture one or more images of an item or a product that facilitate image recognition and retrieval when stored in a database. For example, the guided capture module 209 may generate and provide different size parameters to a user such that images of a product can be taken from different distances from a shelf on which the product is placed. The guided capture module 209 may generate and provide different size parameters for capturing images of a product at different perspectives or angles, and different sides, top or bottom of a product. The guided capture module 209 may also instruct the user to take product images of the same product placed at different positions of the shelf. Since the product images taken from different distances for a product at different positions of a shelf share more similarities with a random query image of the product, a comparison between the query image and the product images stored in a product database may result in more positive matches, and therefore enable a more robust image recognition and greater accuracy. In some embodiments, the guided capture module 209 may also communicate with the product image capture module 207, the dynamic template generation module 211 as well as other components of the image recognition application 103 to apply a machine learning algorithm to train the received images and learn from the training how to improve the searchability of the database.

The dynamic template generation module 211 may include software and/or logic for dynamically generating one or more templates, and sending the one or more templates to the guided capture module 209 for use in guiding the user to capture product images. In some embodiments, the dynamic template generation module 211 uses a machine learning algorithm to determine additional templates that can be added to existing templates for a particular product to enhance the database so that when it is used for recognition, the recognition will be more robust and accurate. For example, for a given product, there are images corresponding to three templates that have been captured and are being used and stored in the database. The dynamic template generation module 211 may train the machine learning algorithm to analyze all images currently representing a product and make recommendations on what additional images to capture to improve future recognitions. As a result, the dynamic template generation module 211 will generate one or more new templates and send the new template to the guided capture module 209 such that a recommended image that fits within this new template can be captured.

Figure 4A:
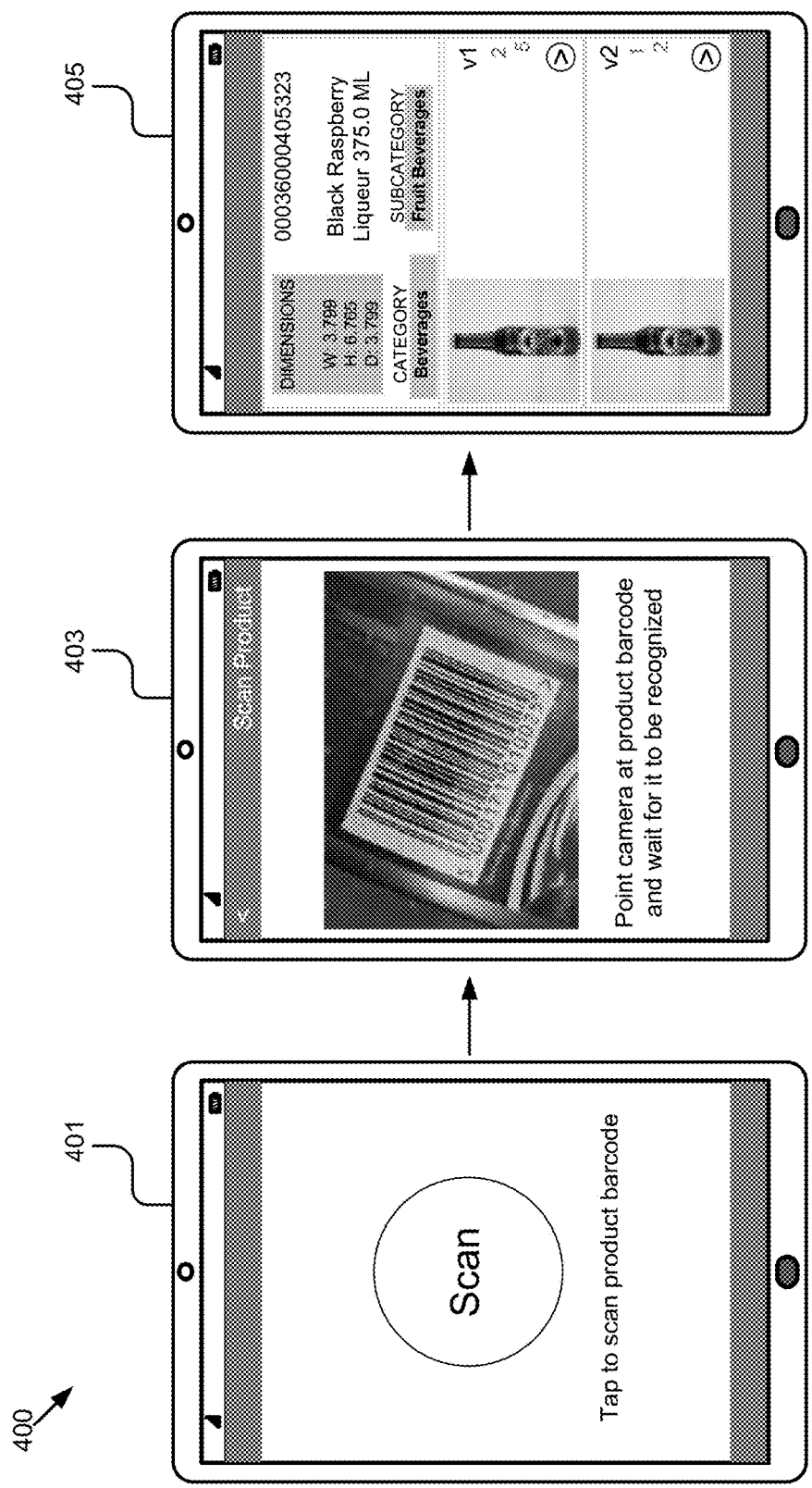
FIG. 4A is a graphical representation of one embodiment of a process for retrieving information of an item from a database.

Referring now to FIG. 4A, a guided information capture process implemented by the guided capture module 209 can be initiated by a data retrieval process as depicted. In the example of FIG. 4A, a user, e.g., a store manager, finds a target product at a shelf of a store. At 401, the guided capture module 209 sends instructions to the user interface module 205 to generate a user interface on the store manager's mobile phone that receives user input of the store manager scanning a barcode of the target product. At 403, the guided capture module 209 updates the user interface to present the received barcode to the store manager. Based on the barcode, the guided capture module 209 searches a product database to determine if the target product identified by the barcode exists in the database. If there is information about the target product in the database, the guided capture module 209 retrieves the product information from the database and communicates with the user interface module 205 to present the retrieved information in the user interface to the store manager as shown in 405. However, in the cases where no information for the target product is available or no sufficient information of the target product is retrieved and presented (e.g., determined based on a rule defined by the guided capture module 209), the guided information capture process would be initiated to receive the information of the target product and to add the received information to the database.

In some embodiments, an item or a product in a database can be broken into a hierarchical structure that includes a UPC, one or more versions, one or more faces, and one or more variants from the top level to the bottom level. The UPC is a unique index used to identify the product. A product identified by a UPC may have multiple versions, where a version represents a different product packaging instance. For example, a product may have a Christmas version, a Thanksgiving version, etc. Each version of a product may have different packaging for the product and contain several faces, e.g., the distinct sides of the product. For example, a product may have front, back, top, bottom, left side, and right-side faces. Each face may include many variants or variant images representing the variety of ways the product appears in the real world. For example, a version of a product includes five variant images of the front to show the slight differences of the product in different angles or different lighting conditions. Sometimes a variant is also referred as an entry.

In some embodiments, the guided capture module 209 performs a guided information capture process to capture variants of a face for a version of a product. FIGS. 4B-4E are graphical representations of one embodiment of data collection operations for a guided information capture process. FIGS. 4F-4I are graphical representations of one embodiment of a guided information capture process for instructing a user to collect information of an item. In the examples of these figures, the guided capture module 209 stored on a smart phone of a user communicates with other components of the image recognition application 103 to generate user interfaces on the smart phone for guiding the user to input product information and capture product images using a camera embedded in the smart phone.

Figure 4B:
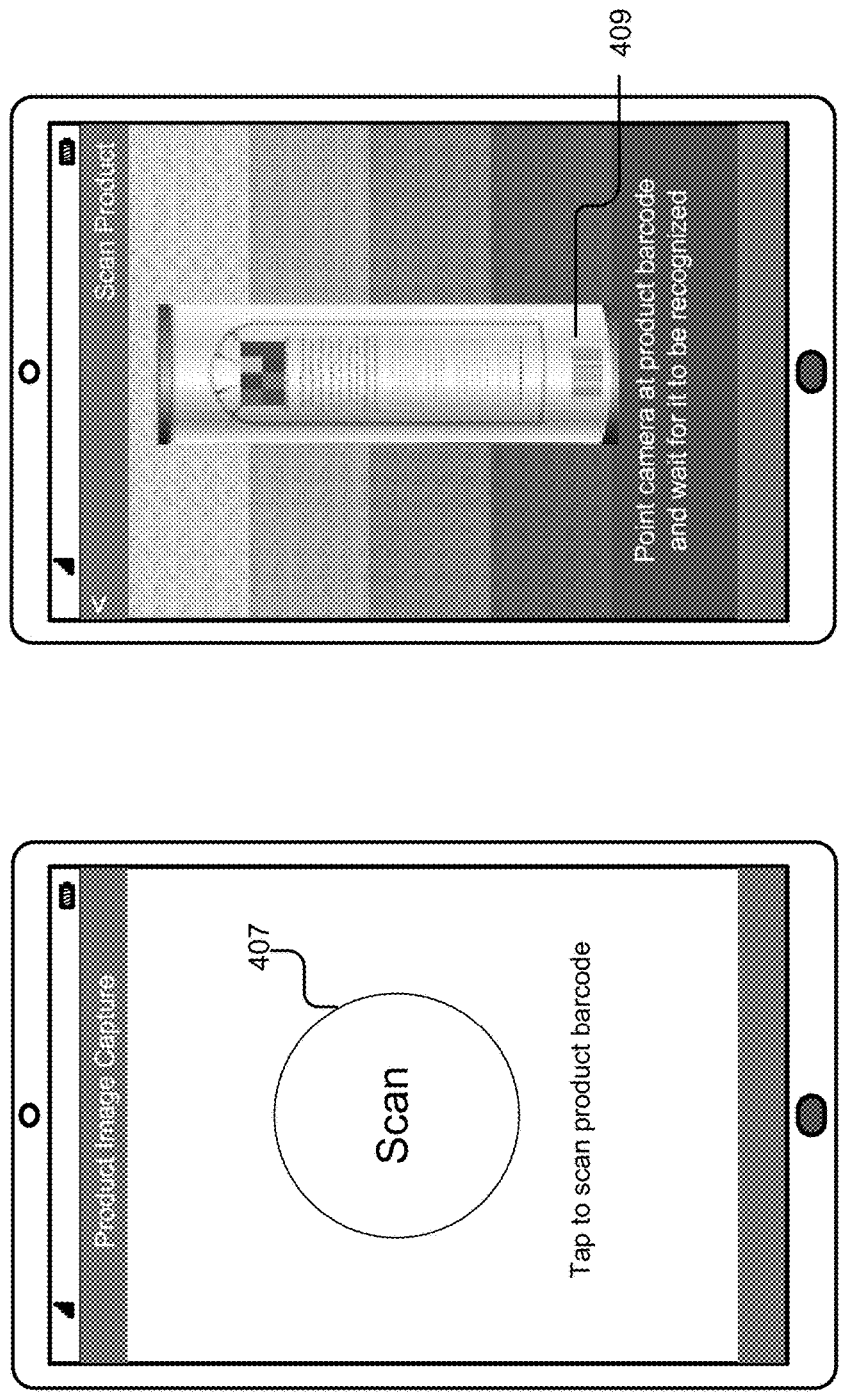
FIGS. 4B-4E are graphical representations of one embodiment of data collection operations for a guided information capture process.

In FIG. 4B, the guided capture module 209 generates a user interface including a "Scan" button 402 for a user to scan a barcode or other identifier of a product. Responsive to a selection of the "Scan" button 407, an image is captured and the guided capture module 209 updates the user interface to present the image. The image may include a barcode 409. The guided capture module 209 communicates with the image processing module 203 to use the barcode 409 to search a product database to see if any information of the corresponding product exists in the database.

Figure 4C:
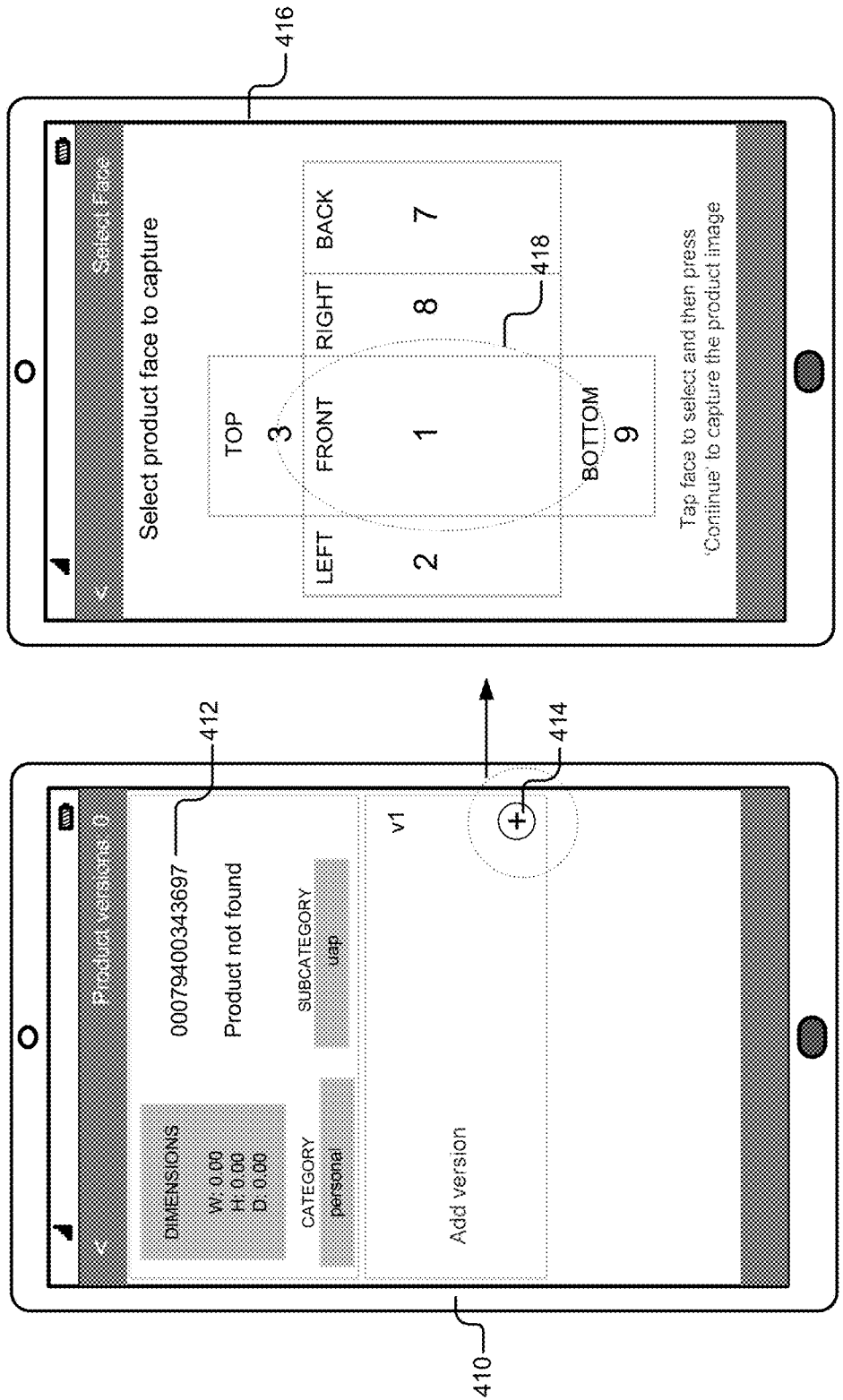

The search result is shown in the user interface 410 of FIG. 4C. In this case, the product does not exist in the product database. No information other than the scanned barcode number 412 is displayed. The guided capture module 209 presents a message "Add version" in the user interface 410 to notify the user that a new version of the product can be added. The guided capture module 209 also includes an action button 414 in the user interface 410 for the user to select and activate the procedure of adding a version as depicted by the callouts.

Once the user selects 414 to add a new version, the guided capture module 209 presents the "Select Face" screen in the user interface 416, where the user selects which face (top, front, right side, etc.) he or she will be capturing. For example, the user chooses the "front" 418 to capture as depicted by the callout.

Figure 4D:
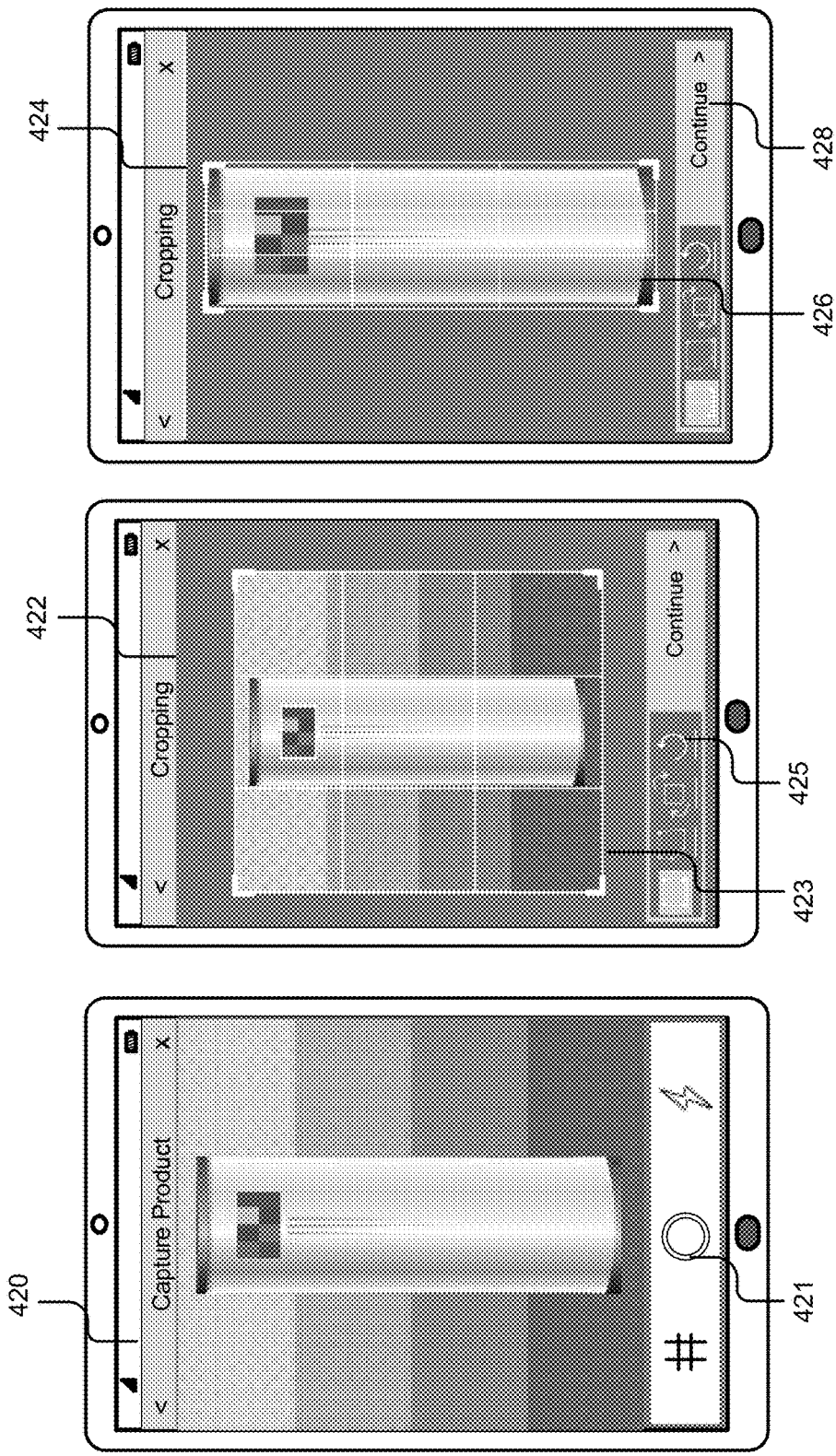

Responsive to a selection of a product face (e.g., front) to capture in the user interface 416 of FIG. 4C, the guided capture module 209 updates the user interface 420 to display a camera view, where the user captures a first image of the front of the product as shown in FIG. 4D by selection of the button 421 in user interface 420. The guided capture module 209 may also generate and present a crop screen 423 in the user interface 422 for the user to crop the image. For example, the user can drag the corners of the crop screen 423 to crop the first image. The guided capture module 209 also provides tools to help the user crop the first image, e.g., selecting the button 425 to redo the cropping. When image cropping is complete, the guided capture module 209 updates the user interface 424 to present the cropped image 426 to the user, and receive user input to continue to the next step at 428. The guided capture module 209 saves the cropped image 426 as the first image of the product responsive to the user input.

Figure 4E:
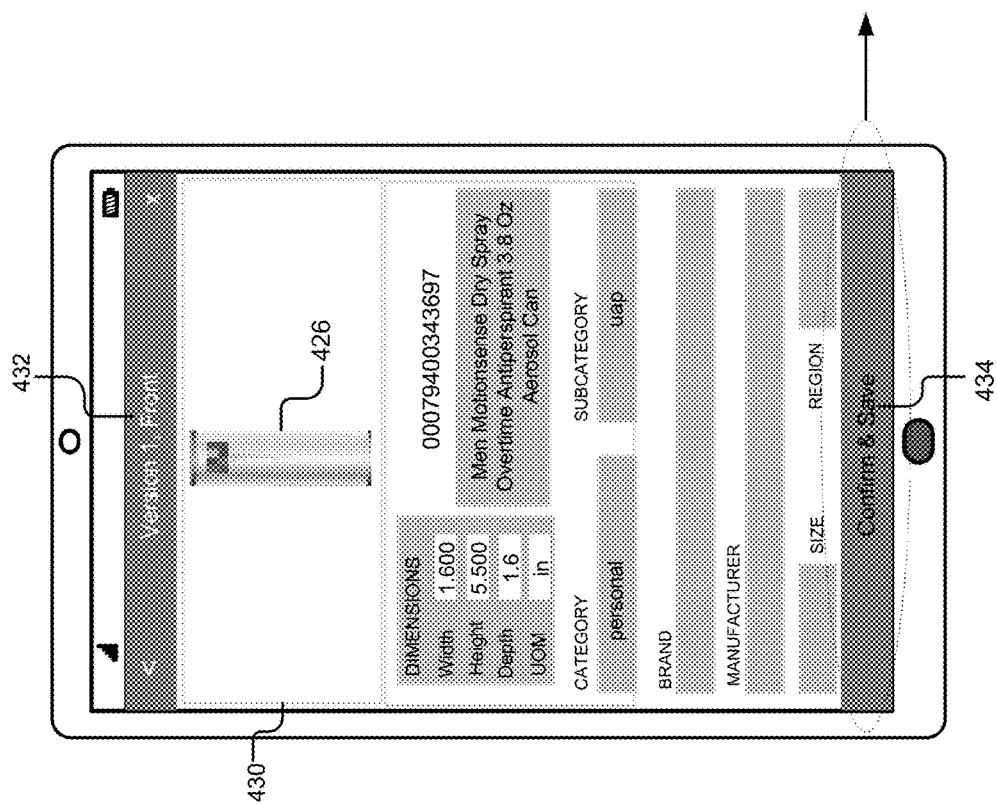

In FIG. 4E, the guided capture module 209 updates the user interface 430 to display the first image 426 of the product. As shown in 432, this first image 426 is an image of the front face of the product in a first version. The guided capture module 209 also prompts the user to input the product information in the user interface 430. The product information includes, but is not limited to, a product name, dimensions of the product, a product category and/or subcategory, a product brand, a product manufacturer, etc. In some embodiments, the guided capture module 209 receives dimensions of the product from manual input by the user. In other embodiments, the guided capture module 209 automatically populates the dimensions of the product responsive to the capture of the first image. The guided capture module 209 may use the dimensions of the product to determine one or more size parameters as described below. Responsive to user selection of "Confirm & Save" button 434 in the user interface 430 as depicted by the callout, the guided capture module 209 saves the product information along with the first image of the product in the product database and generates the user interface 436.

Figure 4F:
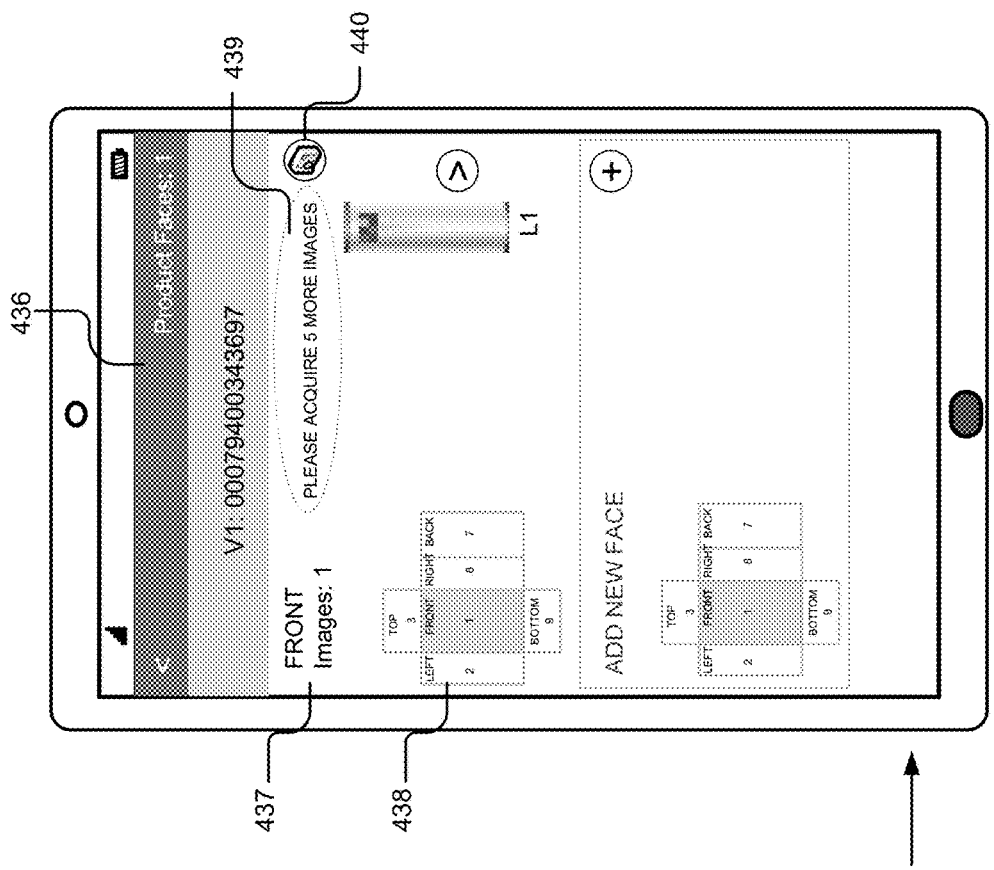
FIGS. 4F-4I are graphical representations of one embodiment of a guided information capture process for instructing a user to collect information of an item.

In FIG. 4F, the guided capture module 209 presents a "Product Face" view in the user interface 436 for displaying the received information about faces of the product and variant images associated with each face. In the example of FIG. 4F, there is only one variant image L1. A text indicator 437 as well as a visual indicator 438 indicate that this variant image L1 is associated with the front face. The guided capture module 209 generates a message 439 of "Please acquire 5 more images" as highlighted by the callout to notify the user that more variants of the front face should be added to the database. When these five images are captured, the message 439 will not be presented.

The camera button 440 is highlighted to show that the user may select it to add a variant image to the face, e.g., the front face. Responsive to receiving the selection of the camera button 440, the guided information capture process starts as the user will operate to obtain product information based on instructions and parameters provided by the user interfaces.

Figure 4G:
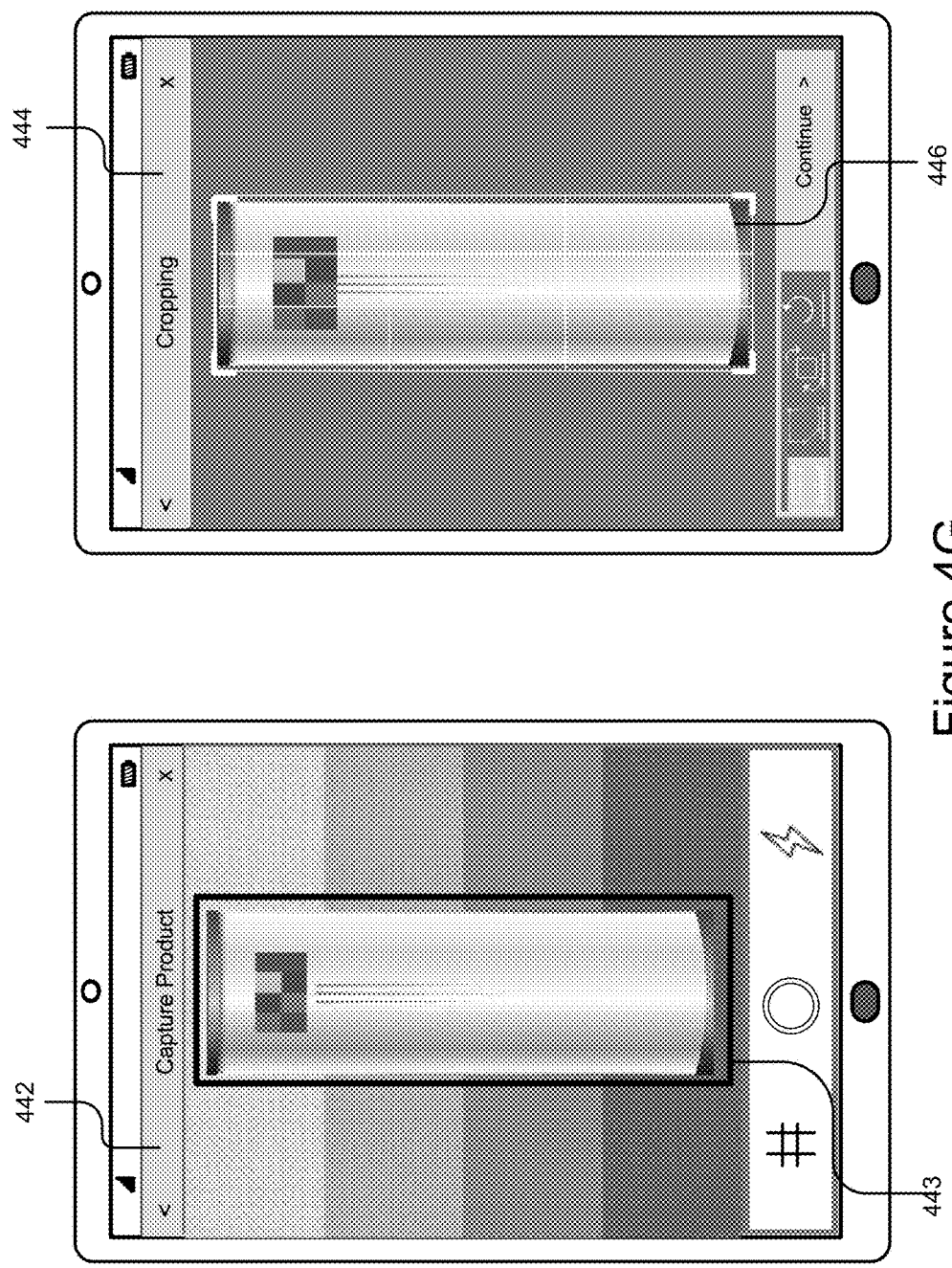

Once the user selects the camera button 440, in FIG. 4G, the guided capture module 209 updates the user interface 442 to present another camera view for the user to capture the variant image. This time a template 443 appears in the camera view. The template is a bounding box (highlighted in bold lines) that is sized to match the dimensions of the product. In the example of FIG. 4G, the template is a rectangle that has the same size as the product, based on the dimensions received in FIG. 4F. It should be understood that the template can have any shape such as a square, a circle, other polygon, or an irregular shape.

When the user positions the camera to have the actual product entered into the camera view of the user interface 442, the guided capture module 209 is configured to present the template or the rectangular overlaid over the image of the actual product shown on the camera view. The user adjusts the position of the camera such that the actual product fits within the rectangle and takes a picture.

When the guided capture module 209 determines that an image has been captured, the guided capture module 209 updates the user interface 444 to display a cropping screen 446. This cropping screen 446 is different from the cropping screen depicted in FIG. 4D. At this stage of the guided information capture process, the guided capture module 209 has received some product information, in particular, dimensions of the product, and therefore can automatically identify a crop zone based at least on the received dimensions. The crop zone is described in more detail with reference to FIGS. 6A-7B. The guided capture module 209 presents the cropping screen 446 with the crop zone already specified to the user such that the image cropping can be easily done, and thus the user experience is improved. If necessary, the user can still refine the image by making adjustments to the crop zone.

Figure 4H:
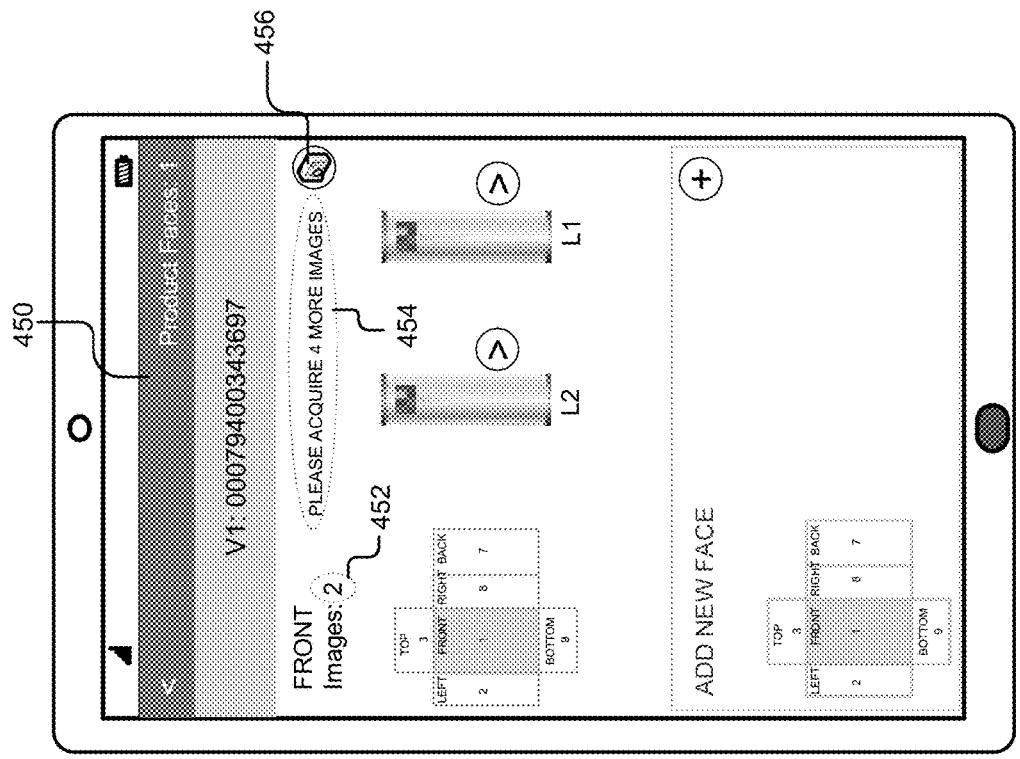

Responsive to the user selection of the "Continue" button in the user interface 444, the guided capture module 209 saves the newly captured image as a second image of the product in the database, and presents the "Product Face" view again in the user interface 450 of FIG. 4H. The user now sees that two images have been captured at 452 and four images remain to be captured for the guided capture process at 454. Similarly, the user may select the camera button 456 to add a next variant image about the front face of the product.

Figure 4I:
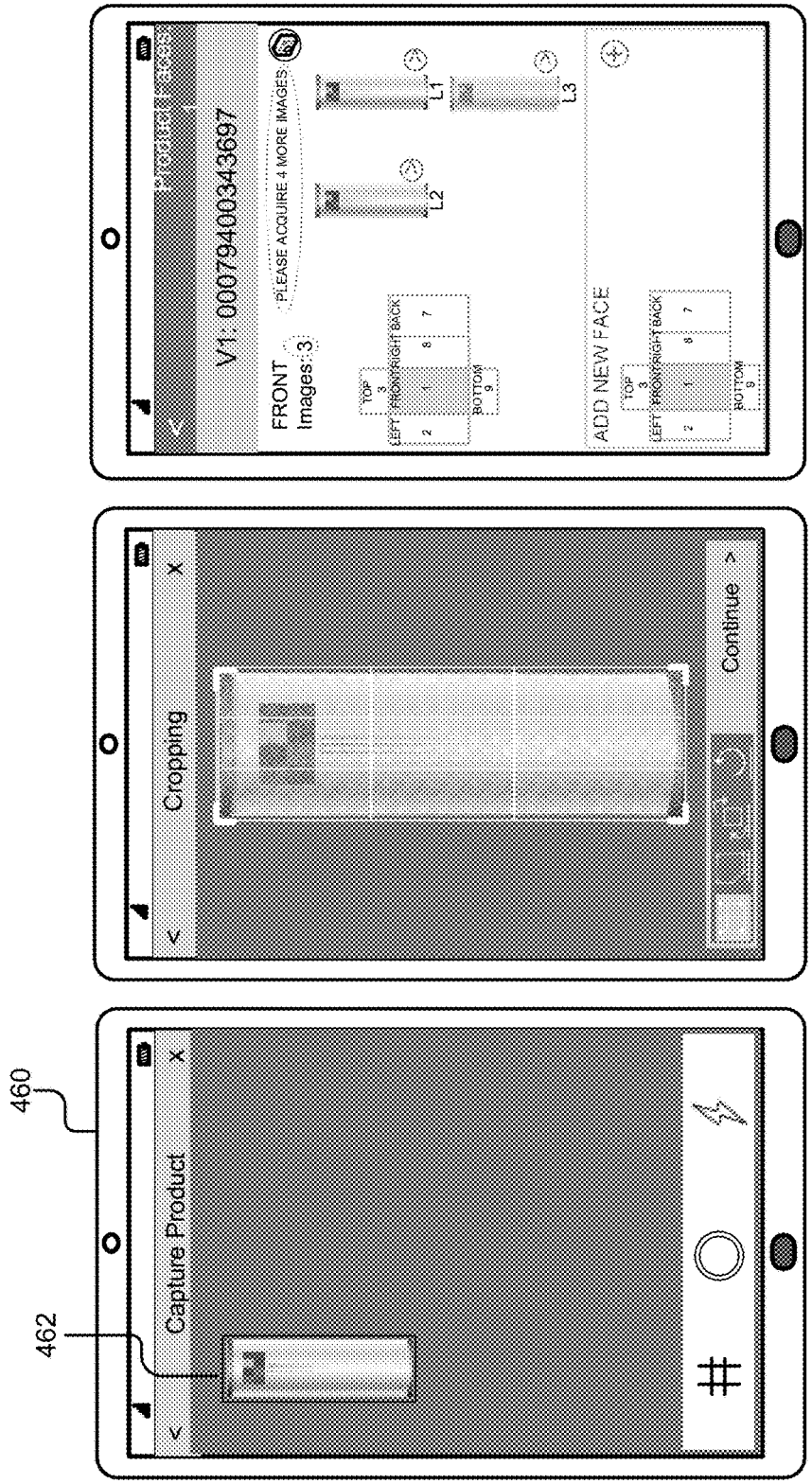

Once receiving the user input for adding the next variant image, the guided capture module 209 generates and presents the user interface 460 in FIG. 4I, which includes a new template 462 with a new size. The templates with different sizes will be described below with reference to FIG. 5. The guided capture module 209 overlays the new template on the product image that the user is taking and instructs the user to fit the image within the template. In the next user interface, the guided capture module 209 presents the crop screen with the crop zone already specified such that the user can easily get the image cropped. Responsive to receiving the user confirmation of completing the capture of this image, the guided capture module 209 returns to the "Product Face" view to show how many images have been captured and how many images are left to be captured. The guided capture process continues until all guided capture templates have been completed and all variants of the face are captured accordingly. In this manner, the guided capture module 209 helps guide a user to capture both the right images and a sufficient number of images. Building a database with these images (e.g., variant images for each face of products) can greatly improve product recognition (e.g., due to the variety of images representing different distance, position, lighting and other conditions), especially when machine learning algorithms are applied to learn from these images.

Figure 5:
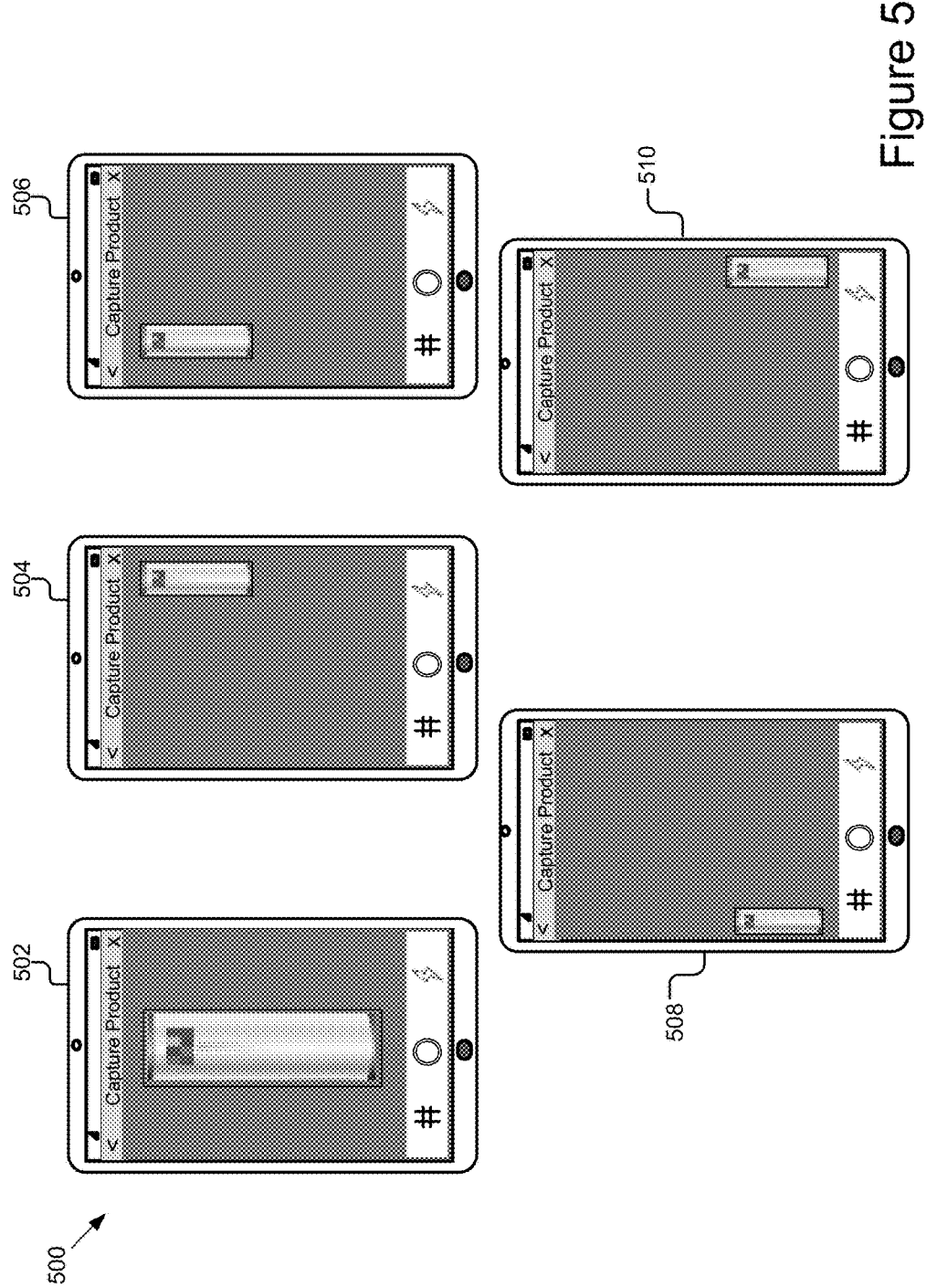
FIG. 5 depicts graphical representations of example guided capture templates.

FIG. 5 is a graphical representation 500 of example guided capture templates. The templates 502, 504, 506, 508, and 510 are used by the guided capture module 209 to capture images of a same face of a same product. However, these templates are distinct on at least two aspects: size and position. In some embodiments, the guided capture module 209 takes into account factors, such as a distance between a camera and the product, a position of the product on a shelf, lighting condition, etc., to determine a template. For example, the guided capture module 209 generates a larger size of template (e.g., 502) such that a user has to move further away from the product to take a picture of the product. Or the guided capture module 209 generates the templates 502-510 to be overlaid at different positions of the camera view, which causes the user to position the camera to different places of a shelf to capture the image of the product at different positions, and thus reflect different lighting conditions or other conditions at different positions. In other embodiments, the guided capture module 209 may also determine a size of a template based on the size captured in a previous crop view. In other words, the guided capture module 209 may determine a new template for the capture of a third image based on the size of the crop zone used in capturing a second image. Since the size of the new template depends on the size of the crop zone, it is always close to the actual size of the product even if the original dimension information of the product inputted by a user is inaccurate.

Figure 6A:
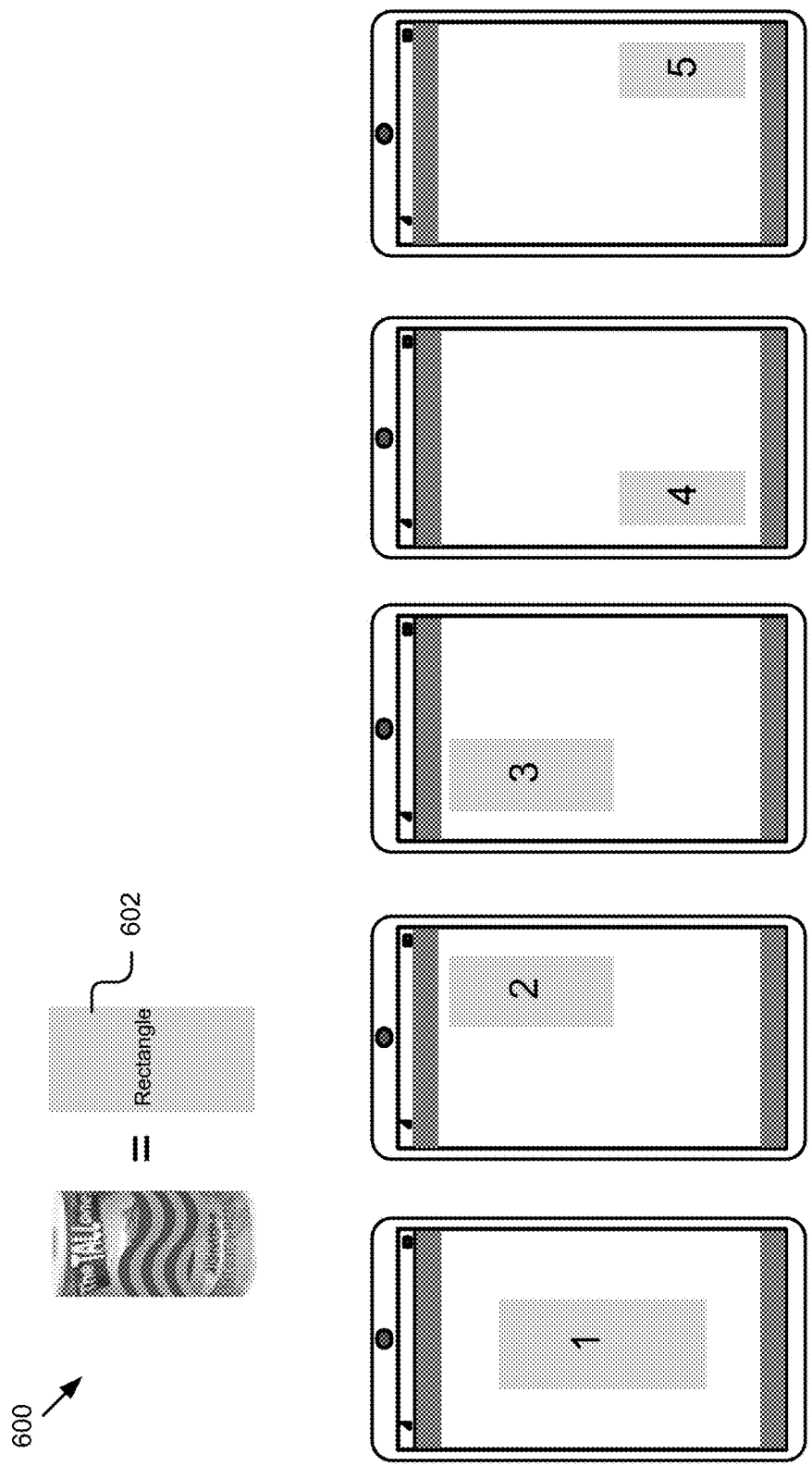
FIGS. 6A and 6B are graphical representations of example capture zones included in user interfaces of a mobile phone.
Figure 6B:
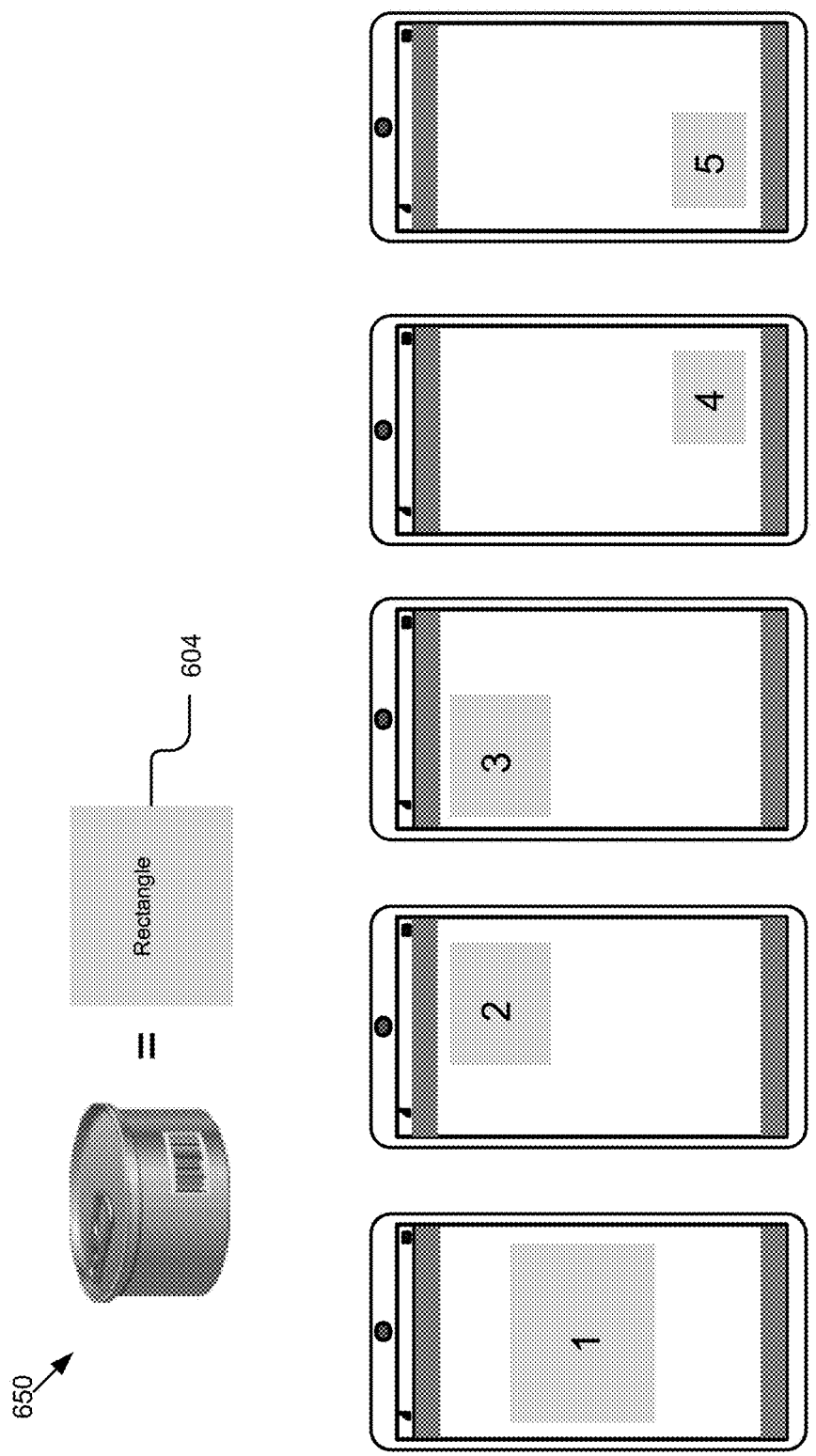

FIGS. 6A and 6B are graphical representations of example capture zones included in user interfaces of a mobile phone. A capture zone or crop zone is the target area in a template where the guided capture module 209 wants a user to capture an image of a product. In some embodiments, the capture zone is rectangular. In this particular example, the template is directed to a product with a vertical aspect ratio. The guided capture module 209 uses an aspect ratio determined based on the product dimensions to identify a capture zone from the template. In some embodiments, responsive to receiving the entire picture of the product, the guided capture module 209 may automatically crop the picture based on the capture zone area when producing the product image. In some embodiments, the guided capture module 209 may also determine a set of templates that position the capture zone at a target location while also adjusting (e.g., shrinking) the size.

As shown at 602 of FIG. 6A, the guided capture module 209 determines a capture zone as a rectangle based on the dimensions of the product. In some embodiments, given the dimensions of the device screen (e.g., the mobile phone in FIG. 6A) and the longest side of the product, the guided capture module 209 uses only width and height to draw the bounding box of the capture zone at a scale that is roughly X % smaller than the screen size. In this way, the guided capture module 209 calculates the dimension of the rectangle for capture #1. For captures #2 and #3, the guided capture module 209 reduces the rectangle for capture #1 by Y %. For captures #4 and #5, the guided capture module 209 reduces the size again by Z %. X, Y and Z are numbers between 0-100. These numbers may or may not be equal.

FIG. 6B shows example capture zones for a different product. In this particular example, the template is directed to a product with a horizontal aspect ratio. Since the guided capture module 209 uses an aspect ratio determined based on the product dimensions to identify a capture zone, the distinct difference between aspect ratios of products in FIGS. 6A and 6B gives the distinct difference between the capture zones in FIGS. 6A and 6B.

Figure 7A:
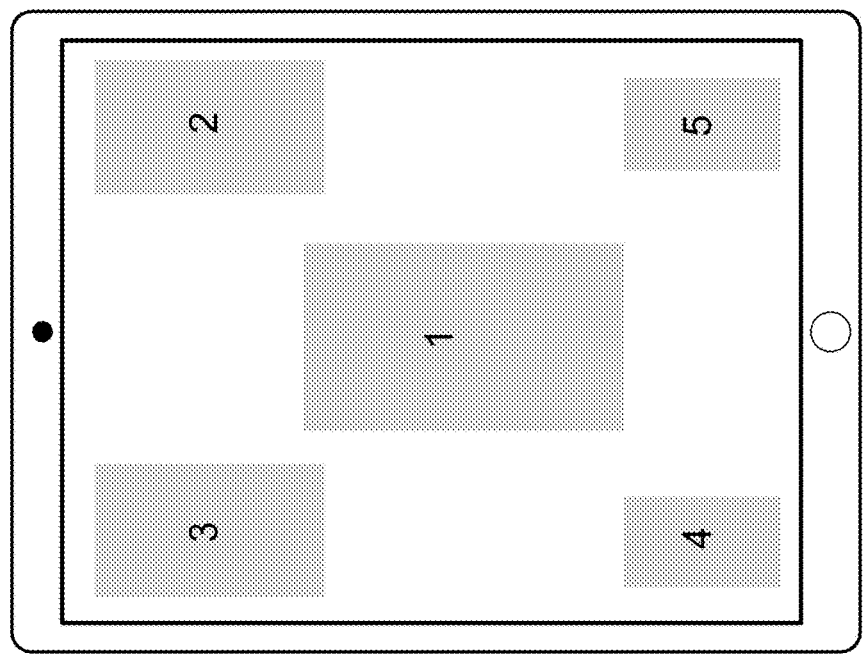
FIGS. 7A and 7B are graphical representations of example capture zones included in user interfaces of a tablet computer.
Figure 7A:
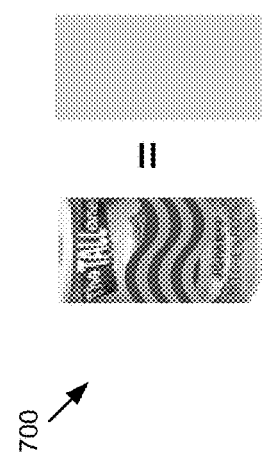
Figure 7B:
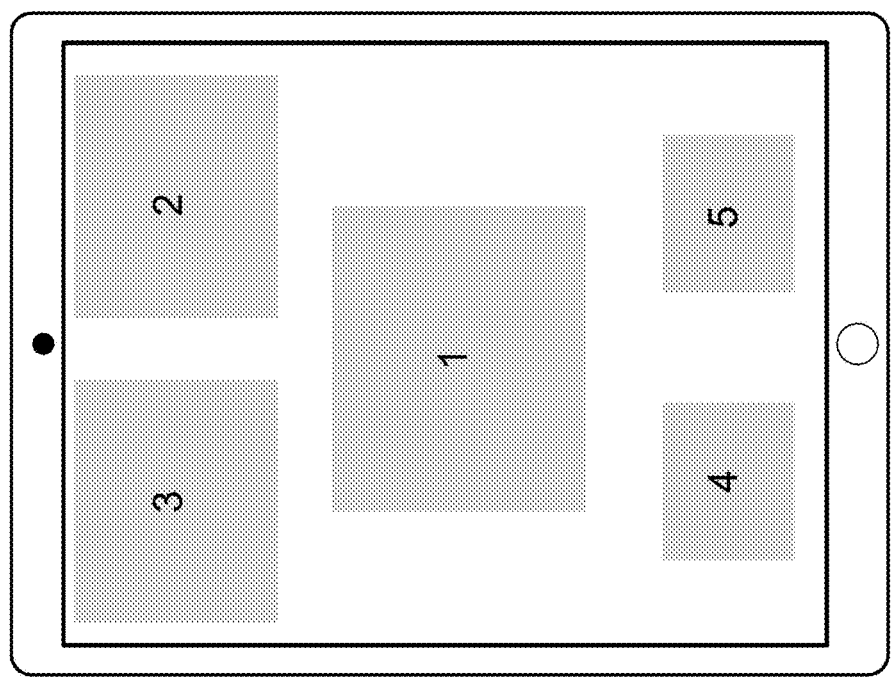
Figure 7B:
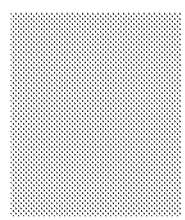
Figure 7B:
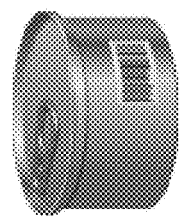

FIGS. 7A and 7B are graphical representations of example capture zones included in user interfaces of a tablet computer. Again, a capture zone is determined based on an aspect ratio related to the product dimensions and the dimensions of the device screen, e.g., the tablet computer. Since the screen dimensions for a tablet are different from a phone, the size and shape of the templates are modified accordingly.

Figure 8:
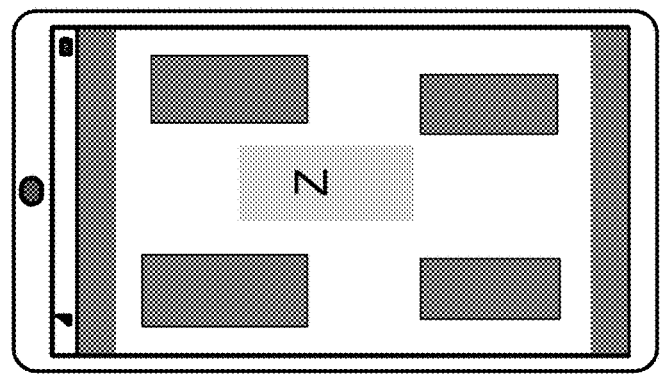
FIG. 8 is a graphical representation of example templates that are dynamically generated based on product variants in a database.
Figure 8:
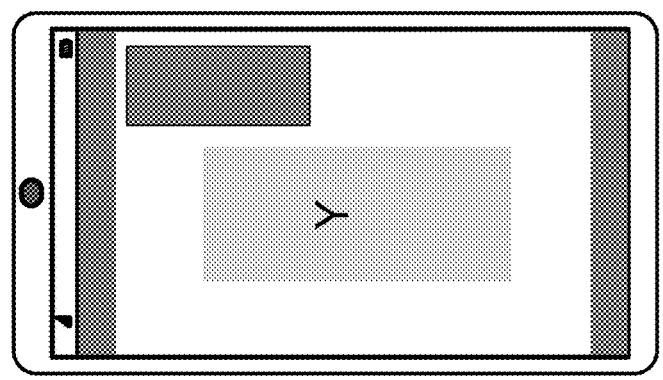
Figure 8:
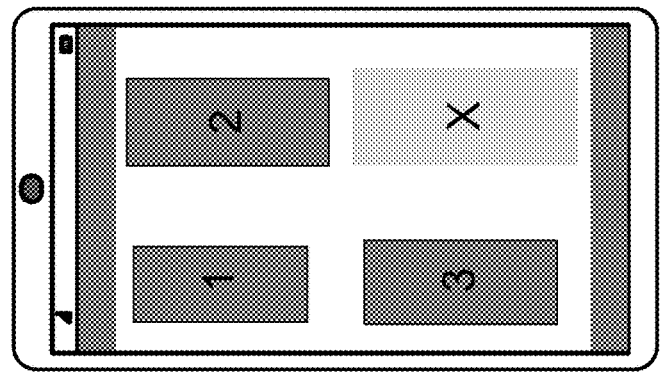

Referring now to FIG. 8, example templates generated by the dynamic template generation module 211 are described. As noted above, the dynamic template generation module 211 may include software and/or logic for dynamically generating templates used in the guided information capture process. As described above, the guided capture module 209 generates and uses a set of templates when guiding a user to capture product images. The guided capture module 209 determines the set of templates based on the dimensions of the product being captured. These templates are static in the sense that each template appears in the same location and is basically the same size with respect to the proportions of the product regardless of the product being captured. However, to improve recognition accuracy, additional templates may be added. The dynamic template generation module 211 determines which templates should be added to increase the accuracy of use of the database.

In some embodiments, the dynamic template generation module 211 dynamically generates one or more templates, and sends the one or more templates to the guided capture module 209 for use in guiding the user to capture product images. In some embodiments, the dynamic template generation module 211 communicates with a machine learning system to receive feedback to the captured information to make adjustments to the size and location in the camera view. For example, if five images have been captured and stored in the database, the dynamic template generation module 211 may train the machine learning algorithm to analyze all images currently representing a product and make recommendations on what additional images to capture to improve future recognitions. As a result, the dynamic template generation module 211 will generate a new template and send the new template to the guided capture module 209 such that a recommended image that fits within this new template can be captured.

FIG. 8 is a graphical representation of example templates that are dynamically generated based on product variants in a database. Templates X, Y, and Z are dynamically generated templates with different sizes and different positions. For example, the dynamic template generation module 211 receives feedback that product images fitting within the templates 1, 2, and 3 have been captured, and determines to generate the template X such that an additional image with the size and location of the template X can be captured and stored. The image recognition would therefore benefit from the images diverse in locations and sizes.

Figure 9:
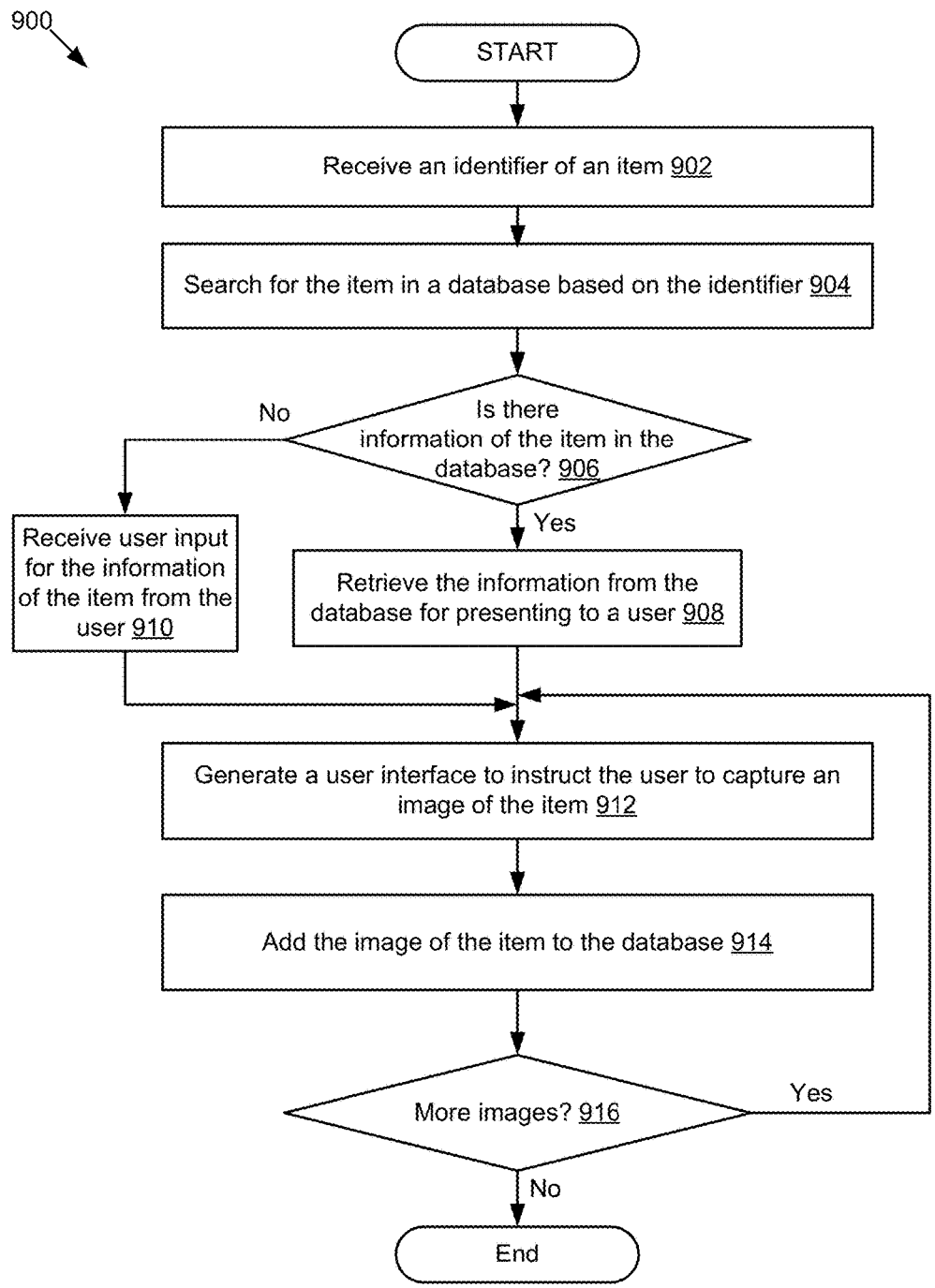
FIG. 9 is a flow diagram illustrating one embodiment of an example method for instructing a user to collect information of an item.

FIG. 9 is a flow diagram illustrating one embodiment of an example method 900 for instructing a user to collect information of an item. At 902, the guided capture module 209 receives an identifier of an item, for example, an image of a UPC. The image processing module 205 recognizes the UPC from the image. At 904, the guided capture module 209 searches for the item in a database based on the identifier. At 906, the guided capture module 209 determines whether there is information for the item in the database. For example, the guided capture module 209 communicates with the image processing module 203, the product image capture module 207 to receive and read a barcode of a product scanned by a user, search a product database based on the barcode, and determine whether the product database includes product information. If the database includes the information for the item, at 908, the guided capture module 209 retrieves the information from the database for presentation to a user. Otherwise, at 910, the guided capture module 209 receives user input of the information for the item from the user. For example, the guided capture module 209 communicates with the product image capture module 207 and the user interface module 205 to prompt the user to input a product name, a product category, and product dimensions, etc. In some embodiments, the guided capture module 209 may store the information of the item received from the user in the database.

Once the information for the item is received from the user or retrieved from the database, at 912, the guided capture module 209 communicates with the product image capture module 207 and the user interface module 205 to generate a user interface to instruct the user to capture an image of the item. In some embodiments, the information of the item includes dimensions of the item. The guided capture module 209 may generate a user interface for presenting a template and instructing the user to capture a variant image of the item based on the template. The variant image corresponds to a face of the item. The template is a bounding box that is sized to match the dimensions of the item.

At 914, the image is captured by the user and the guided capture module 209 adds the image of the item to the database. At 916, the guided capture module 209 determines whether more images need to be captured. If so, the method 900 returns back to 912 to generate a user interface to instruct the user to capture more images. If no more images are needed, for example, the number of the received images is sufficient for robust image recognition on the database, the method 900 ends.

Figure 10A:
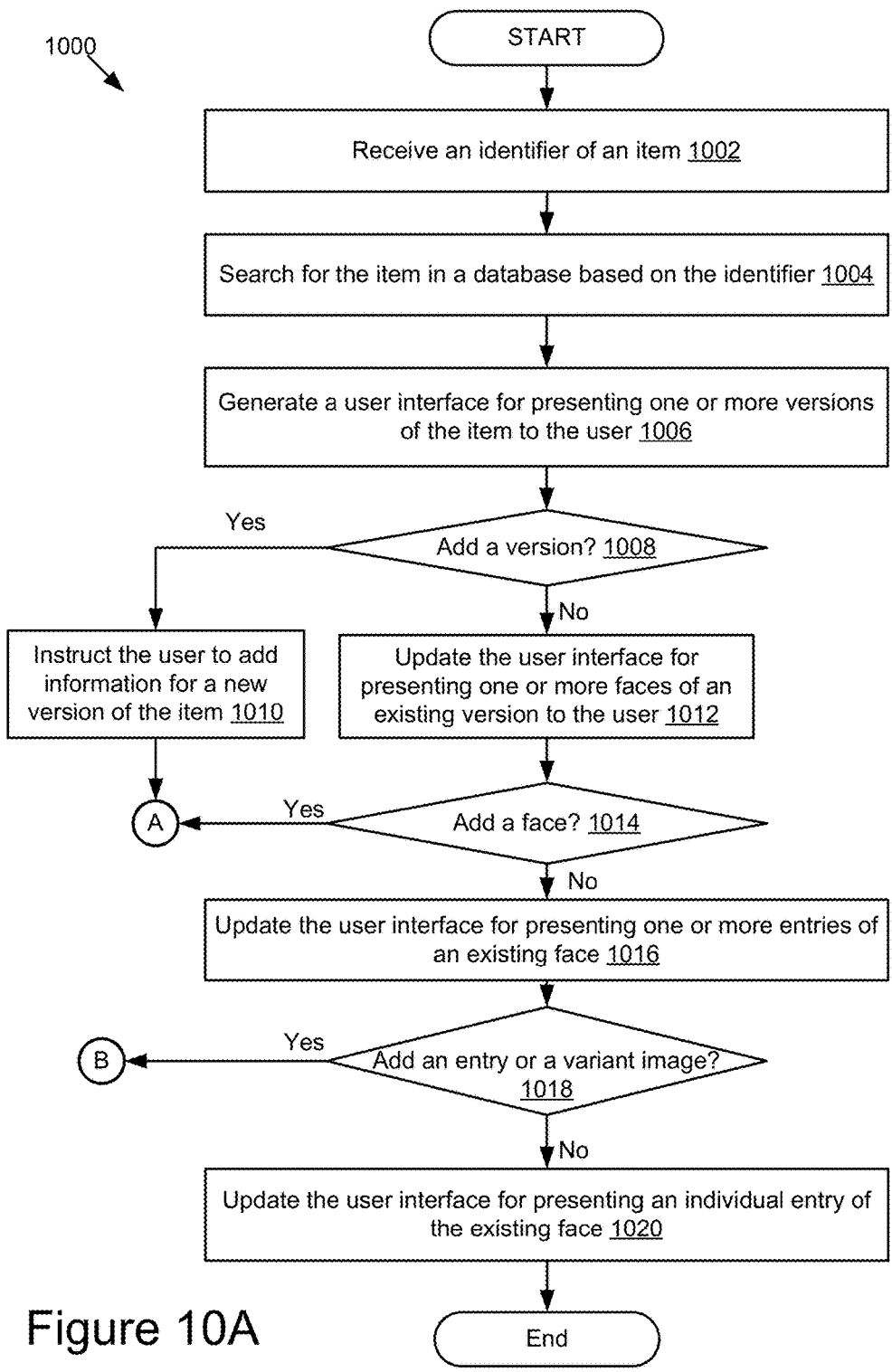
FIG. 10A-10C are flow diagrams illustrating one embodiment of an example method for generating user interfaces for presenting a set of templates to guide a user to capture images of correctly size items under different conditions.
Figure 10B:
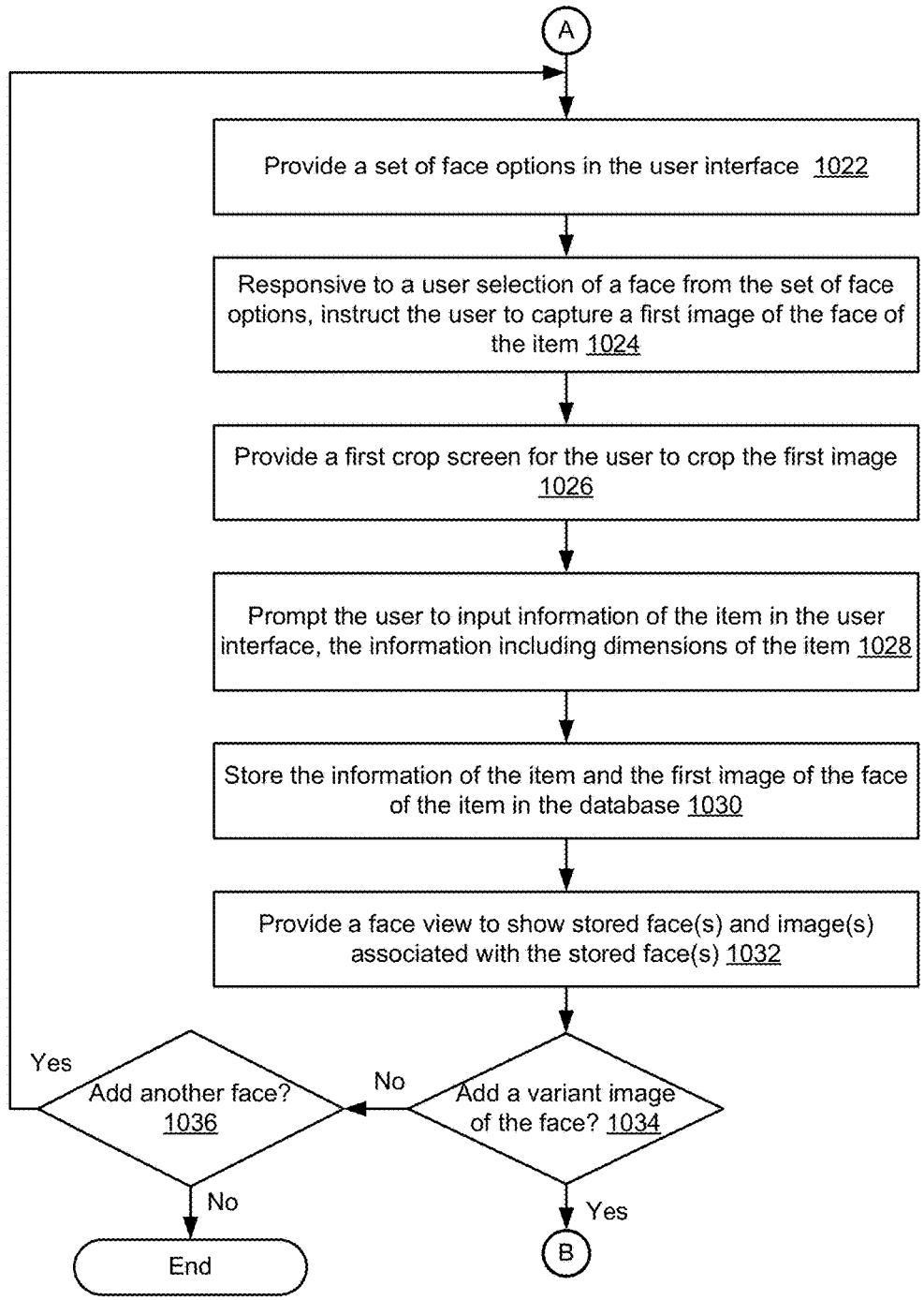
Figure 10C:
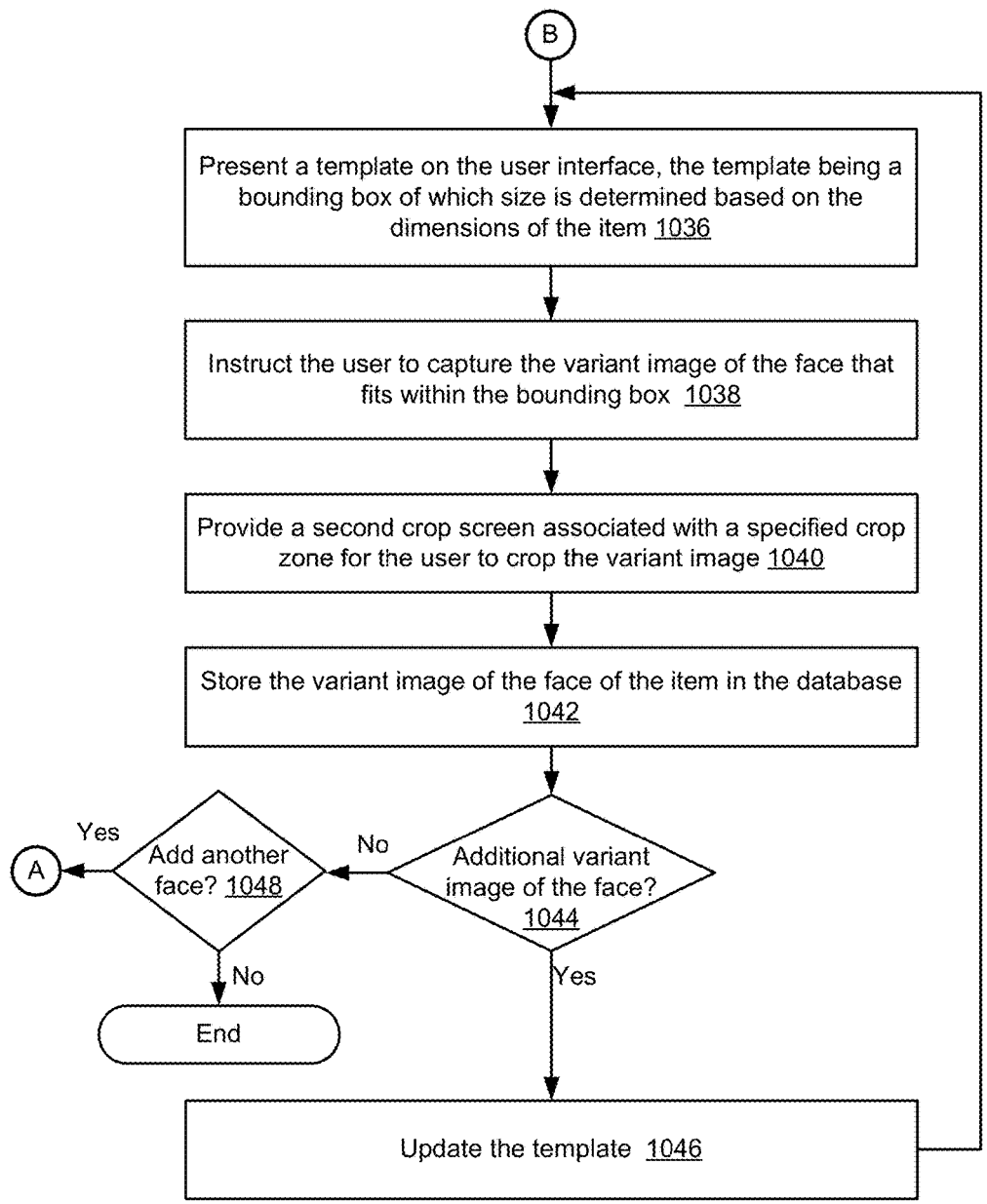

FIG. 10A-10C are flow diagrams 1000 illustrating one embodiment of an example method for generating user interfaces for presenting a set of templates to guide a user to capture image of correctly size items under different conditions. At 1002, the guided capture module 209 receives an identifier for an item. At 1004, the guided capture module 209 searches for the item in a database based on the identifier. At 1006, the guided capture module 209 generates a user interface for presenting one or more versions of the item to the user. At 1008, the guided capture module 209 determines whether to add a version of the item to the database. If there is no information about the item stored in the database, the guided capture module 209 generates, at 1010, a user interface instructing the user to add information of the item, and then the method 900 moves to step 1022 in FIG. 10B to add faces and information for that new version. If it is determined at 1008 that a version of the item exists in the database, at 1012, the guided capture module 209 updates the user interface to present one or more faces of an existing version to the user, for example, presenting example images of the back and left sides of a product in the user interface. At 1014, the guided capture module 209 determines whether to add a face. If so, the guided capture module 209 also moves to step 1022 in FIG. 10B, for example, to add a front face image of the product as will be described below. If the guided capture module 209 determines not to add a face, at 1016, the guided capture module 209 updates the user interface to present one or more entries of an existing face. An entry is a variant image of the same face. For example, the user interface presents the variant faces stored in the database, e.g., if there are five variants for the front face, the user interface displays five front face images of a product. At 1018, the guided capture module 209 determines whether to add an entry or a variant image of the face to the database. If so, the method 1000 moves to FIG. 10C as will be described below. Otherwise, at 1020, the guided capture module 209 updates the user interface to present an individual entry of the existing face. For example, the user sees the first image of the five back images of the product.

Referring now to FIG. 10B, at 1022, the guided capture module 209 provides a set of face options in the user interface. At 1024, responsive to a user selection of a face from the set of face options, the guided capture module 209 presents a user interface that instructs the user to capture a first image of the face of the item. At 1026, the guided capture module 209 presents a user interface that provides a first crop screen for the user to crop the first image. At 1028, the guided capture module 209 presents a user interface that prompts the user to input information of the item in the user interface, the information including dimensions of the item. At 1030, the guided capture module 209 stores the information of the item and the first image of the face of the item in the database. At 1032, the guided capture module 209 provides a face view to show stored face(s) and image(s) associated with the stored face(s). At 1034, the guided capture module 209 determines whether to add a variant image of the face. If it is determined that a variant image of the face should be added, the method proceeds to FIG. 10C. Otherwise, at 1036, the guided capture module 209 determines whether to add another face. If it is determined not to add another face, the method 1000 ends. If it is determined to add another face, the method 1000 return to step 1022 to repeat the procedure of adding a face.

Referring to FIG. 10C, at 1036, the guided capture module 209 presents a user interface including template, the template being a bounding box of which size is determined based on the dimensions of the item. At 1038, the guided capture module 209 presents a user interface that instructs the user to capture the variant image of the face that fits within the bounding box. At 1040, the guided capture module 209 presents a user interface that provides a user interface that a second crop screen associated with a specified crop zone for the user to crop the variant image. At 1042, the guided capture module 209 stores the variant image of the face of the item in the database. At 1044, the guided capture module 209 determines whether to add a variant image of the face. If it is determined a variant image of the face should be added, at 1046, the guided capture module 209 updates the template. The method 1000 returns back to 1036 to start adding another variant image of the face. However, if it is determined that there is no need to add another variant image of the face, at 1048, the guided capture module 209 determines whether to add another face. If it is determined to add another face, the method 1000 returns back to step 1022 in FIG. 10B for adding the face. Otherwise, the method 1000 ends.

A system and method for generating user interfaces for presenting a set of templates to guide a user to capture images of the items correctly sized under different conditions has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
generating a first user interface configured to receive and present product information for an item including dimensions of the item;
receiving a first image;
generating a second user interface to present a template, the template including a bounding box sized to match the dimensions of the item, the second user interface configured to present the bounding box overlaid over a second image;
receiving input to capture a portion of the second image within the bounding box;
responsive to the input to capture the portion of the second image, generating a third user interface to present the first image and the captured portion of the second image as variants of a face of the item; and
storing the captured portion of the second image as a variant of the face of the item and the information of the item in a database.

2. The computer-implemented method of claim 1, further comprising generating an initial user interface instructing the capture of an initial image, and using the initial image to retrieve the product information for the item and present the product information in the first user interface.

3. The computer-implemented method of claim 1, further comprising determining the template based on one from the group of a distance between the item and a capture device capturing the second image of the item, a position of the item, and lighting condition of the item.

4. The computer-implemented method of claim 1, further comprising:
determining an aspect ratio based on the dimensions of the item;
identifying a capture zone from the bounding box based on the aspect ratio; and
wherein receiving the input to capture the portion of the second image within the bounding box comprises receiving the portion of the second image that is cropped based on the capture zone.

5. The computer-implemented method of claim 1, further comprising generating a new template based on training received images of the item using a machine learning algorithm.

6. The computer-implemented method of claim 1, further comprising generating a set of templates to be overlaid at different positions of a set of user interfaces, and receiving a set of images of the item that fit within the set of templates.

7. The computer-implemented method of claim 1, wherein generating the first user interface is based on a card, the card including format and layout information of labels and fields displayed on the first user interface.

8. The computer-implemented method of claim 1, further comprising authenticating the user.

9. A system comprising:
one or more processors; and
a memory, the memory storing instructions, which when executed cause the one or more processors to:
generate a first user interface configured to receive and present product information for an item including dimensions of the item;
receive a first image;
generate a second user interface to present a template, the template including a bounding box sized to match the dimensions of the item, the second user interface configured to present the bounding box overlaid over a second image;
receive input to capture a portion of the second image within the bounding box;
responsive to the input to capture the portion of the second image, generate a third user interface to present the first image and the captured portion of the second image as variants of a face of the item; and
store the captured portion of the second image as a variant of the face of the item and the information of the item in a database.

10. The system of claim 9, wherein the instructions further cause the one or more processors to generate an initial user interface instructing the capture of an initial image, and use the initial image to retrieve the product information for the item and present the product information in the first user interface.

11. The system of claim 9, wherein the instructions further cause the one or more processors to determine the template based on one from the group of a distance between the item and a capture device capturing the second image of the item, a position of the item, and lighting condition of the item.

12. The system of claim 9, wherein the instructions further cause the one or more processors to:
determine an aspect ratio based on the dimensions of the item;
identify a capture zone from the bounding box based on the aspect ratio; and
wherein receiving the input to capture the portion of the second image within the bounding box comprises receiving the portion of the second image that is cropped based on the capture zone.

13. The system of claim 9, wherein the instructions further cause the one or more processors to generate a new template based on training received images of the item using a machine learning algorithm.

14. The system of claim 9, wherein the instructions cause the one or more processors to generate a set of templates to be overlaid at different positions of a set of user interfaces, and receive a set of images of the item that fit within the set of templates.

15. The system of claim 9, wherein the instructions cause the one or more processors to generate the first user interface based on a card, the card including format and layout information of labels and fields displayed on the first user interface.

16. A computer program product comprising a non-transitory computer readable medium storing a computer readable program, wherein the computer readable program when executed causes a computer to:
generate a first user interface configured to receive and present product information for an item including dimensions of the item;
receive a first image;
generate a second user interface to present a template, the template including a bounding box sized to match the dimensions of the item, the second user interface configured to present the bounding box overlaid over a second image;
receive input to capture a portion of the second image within the bounding box;
responsive to the input to capture the portion of the second image, generate a third user interface to present the first image and the captured portion of the second image as variants of a face of the item; and
store the captured portion of the second image as a variant of the face of the item and the information of the item in a database.

17. The computer program product of claim 16, wherein the computer readable program causes the computer to generate an initial user interface instructing the capture of an initial image, and use the initial image to retrieve the product information for the item and present the product information in the first user interface.

18. The computer program product of claim 16, wherein the computer readable program causes the computer to determine the template based on one from the group of a distance between the item and a capture device capturing the second image of the item, a position of the item, and lighting condition of the item.

19. The computer program product of claim 16, wherein the computer readable program causes the computer to:
determine an aspect ratio based on the dimensions of the item;
identify a capture zone from the bounding box based on the aspect ratio; and
wherein receiving the input to capture the portion of the second image within the bounding box comprises receiving the portion of the second image that is cropped based on the capture zone.

20. The computer program product of claim 16, wherein the computer readable program causes the computer to generate a new template based on training received images of the item using a machine learning algorithm.

* * * * *